United States Patent
Beaver et al.

(10) Patent No.: US 12,552,808 B2
(45) Date of Patent: Feb. 17, 2026

(54) DIOL DESYMMETRIZATION BY NUCLEOPHILIC AROMATIC SUBSTITUTION

(71) Applicant: AMGEN INC., Thousand Oaks, CA (US)

(72) Inventors: Matthew G. Beaver, Natick, MA (US); Joseph Michael Dennis, San Diego, CA (US); Peter Dornan, Stoneham, MA (US); Steven Mennen, Boston, MA (US); Jason S. Tedrow, Salem, MA (US); Neil F. Langille, Sudbury, MA (US); Carolyn Michelle Cohen, Somerville, MA (US); Andreas Rene Rotheli, Wellesley, MA (US)

(73) Assignee: AMGEN INC., Thousand Oaks, CA (US)

( * ) Notice: Subject to any disclaimer, the term of this patent is extended or adjusted under 35 U.S.C. 154(b) by 509 days.

(21) Appl. No.: 18/024,716

(22) PCT Filed: Sep. 1, 2021

(86) PCT No.: PCT/US2021/048588
§ 371 (c)(1),
(2) Date: Mar. 3, 2023

(87) PCT Pub. No.: WO2022/051317
PCT Pub. Date: Mar. 10, 2022

(65) Prior Publication Data
US 2023/0365588 A1 Nov. 16, 2023

Related U.S. Application Data

(60) Provisional application No. 63/074,241, filed on Sep. 3, 2020.

(51) Int. Cl.
C07D 513/00 (2006.01)
C07D 513/10 (2006.01)
C07D 519/00 (2006.01)

(52) U.S. Cl.
CPC ......... C07D 513/10 (2013.01); C07D 519/00 (2013.01); C07B 2200/07 (2013.01)

(58) Field of Classification Search
CPC .......................... C07D 513/00; C07D 519/00
(Continued)

(56) References Cited

U.S. PATENT DOCUMENTS

| | | |
|---|---|---|
| 9,487,535 B2 | 11/2016 | Sun |
| 9,562,061 B2 | 2/2017 | Brown et al. |
| 10,300,075 B2 | 5/2019 | Brown et al. |

FOREIGN PATENT DOCUMENTS

| | | |
|---|---|---|
| JP | 2005527617 | 9/2005 |
| JP | 2015516389 | 6/2015 |

(Continued)

OTHER PUBLICATIONS

Bella et al., "Organocatalytic Regio- and Asymmetric C-Selective SNAr ReactionssStereoselective Synthesis of Optically Active Spiro-pyrrolidone-3,3¢-oxoindoles" *J. Am. Chem. Soc.* 2005, 127, 3670-3671.
(Continued)

*Primary Examiner* — Kahsay Habte

(57) ABSTRACT

Provided herein are processes for synthesizing Mcl-1 inhibitors and intermediates such as compound Y that can be used to prepare them where the variable $R^1$ is as defined herein. In particular, provided herein are processes for synthesizing compound A1, and salts or solvates thereof, compound A2, and salts and solvates thereof, and compound A3 and salts and solvates thereof.

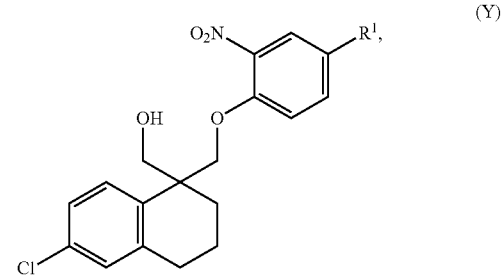

(Y)

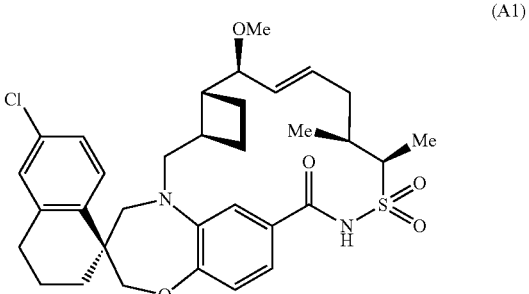

(A1)

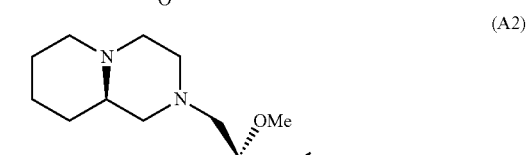

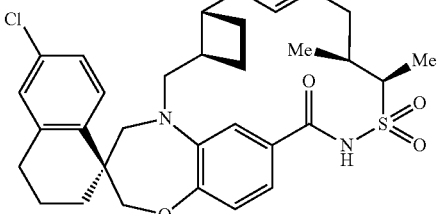

(A2)

(Continued)

-continued

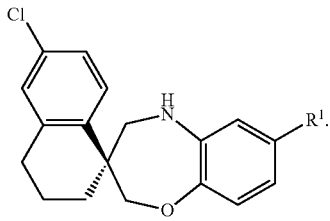

(A3A)

25 Claims, No Drawings

(58) Field of Classification Search
 USPC .......................................................... 540/488
 See application file for complete search history.

(56) References Cited

FOREIGN PATENT DOCUMENTS

| | | |
|---|---|---|
| JP | 2015521987 | 8/2015 |
| WO | 2003099763 | 12/2003 |
| WO | 2014005217 | 1/2014 |
| WO | 2020056089 | 3/2020 |
| WO | 2020103815 | 5/2020 |
| WO | 2020/147802 A1 | 7/2020 |

OTHER PUBLICATIONS

Islas-Gonzalez et al., "From central to planar chirality, the first example of atropenantioselective cycloetherification" *Org. Biomol. Chem.* 2003, 1, 30-32.

PCT/US2021/048588 International Search Report and Written Opinion (11 pages).

DIOL DESYMMETRIZATION BY NUCLEOPHILIC AROMATIC SUBSTITUTION

CROSS REFERENCES TO RELATED APPLICATIONS

This application is a national stage application under 35 U.S.C. § 371 of International Application No. PCT/US2021/048588, filed internationally on Sep. 1, 20217237, and claims priority to and the benefit of U.S. Provisional Application No. 63/074,241, filed on Sep. 3, 2020, which is hereby incorporated by reference in its entirety and for all purposes as if fully set forth herein.

BACKGROUND

Technical Field

The present disclosure relates to processes for synthesizing intermediates useful in preparing (1S,3'R,6'R,7'S,8'E,11'S, 12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$0$^{19,24}$]pentacosa[8,16,18,24]tetraen]-15'-one 13',13'-dioxide (compound A1; AMG 176), a salt, or solvate thereof and in preparing (1S,3'R,6'R,7'R,8'E,11'S,12'R)-6-chloro-7'-methoxy-11',12'-dinethyl-7'((9aR)-octahydro-2H-pyrido[1,2-a]pyrazin-2-ylmethyl)-3,4-dihydro-2H,15'H-spiro[naphthalene-1,22'[20]oxa[13]thia[1,14]diazatetracyclo [14.7.2.0$^{3,6}$.0$^{19,24}$]pentacosa[8,16,18,24]tetraen]-15'-one 13',13'-dioxide (compound A2; AMG 397), a salt, or solvate thereof. These compounds are inhibitors of myeloid cell leukemia 1 protein (Mcl-1).

Description of Related Technology

The compound, (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo [14.7.2.0$^{3,6}$.0$^{19,24}$]pentacosa[8,16,18,24]tetraen]-15'-one 13',13'-dioxide (compound A1), is useful as an inhibitor of myeloid cell leukemia 1 (Mcl-1):

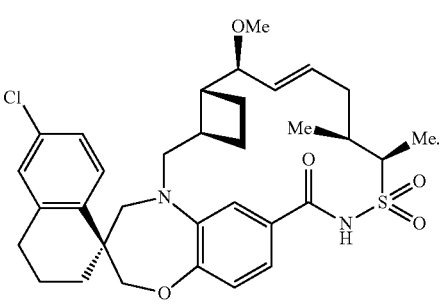

(A1)

The compound, (1S,3'R,6'R,7'R,8'E,11'S,12'R)-6-chloro-7'-methoxy-11',12'-dinethyl-7'((9aR)-octahydro-2H-pyrido[1,2-a]pyrazin-2-ylmethyl)-3,4-dihydro-2H,15'H-spiro[naphthalene-1,22'[20]oxa[13]thia[1,14]diazatetracyclo [14.7.2.0$^{3,6}$.0$^{19,24}$]tetraen]-15'-one 13',13'-dioxide (compound A2), is useful as an inhibitor of myeloid cell leukemia 1 (Mcl-1):

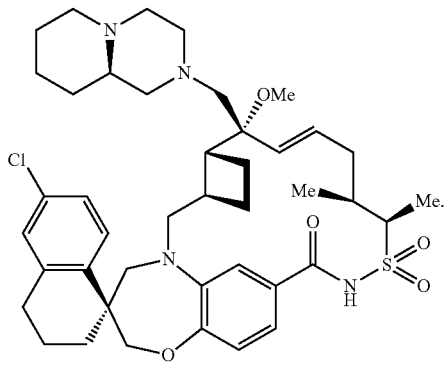

(A2)

One common characteristic of human cancer is overexpression of Mcl-1. Mcl-1 overexpression prevents cancer cells from undergoing programmed cell death (apoptosis), allowing the cells to survive despite widespread genetic damage.

Mcl-1 is a member of the Bcl-2 family of proteins. The Bcl-2 family includes pro-apoptotic members (such as BAX and BAK) which, upon activation, form a homo-oligomer in the outer mitochondrial membrane that leads to pore formation and the escape of mitochondrial contents, a step in triggering apoptosis. Antiapoptotic members of the Bcl-2 family (such as Bcl-2, Bcl-XL, and Mcl-1) block the activity of BAX and BAK. Other proteins (such as BID, BIM, BIK, and BAD) exhibit additional regulatory functions. Research has shown that Mcl-1 inhibitors can be useful for the treatment of cancers. Mcl-1 is overexpressed in numerous cancers.

U.S. Pat. No. 9,562,061, which is incorporated herein by reference in its entirety, discloses compound A1 as an Mcl-1 inhibitor and provides a method for preparing it. However, improved synthetic methods that result in reduced costs and reduced manufacturing timeline of compound A1 are desired, particularly for the commercial production of compound A1.

U.S. Pat. No. 10,300,075, which is incorporated herein by reference in its entirety, discloses compound A2 as an Mcl-1 inhibitor and provides a method for preparing it. However, improved synthetic methods that result in reduced costs and reduced manufacturing timeline of compound A2 are desired, particularly for the commercial production of compound A2.

SUMMARY

Provided herein are process for synthesizing compound Y, or a salt thereof:

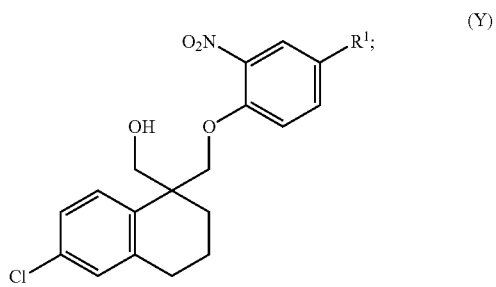

(Y)

comprising:
admixing compound (I), compound (II), a catalyst, and a base in a bi-phasic solvent system to form compound Y:

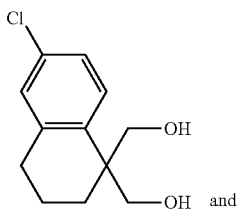
(I)

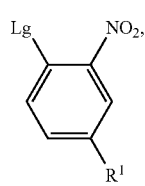
(II)

wherein $R^1$ is $CO_2C_{1-6}$alkyl, $CO_2H$, $CON(C_{1-6}alkyl)_2$, $CO_2Ar^1$, $CO_2Bn$, or CN, Lg is a leaving group, and $Ar^1$ is $C_6$-$C_{22}$ aryl or a 5-12 membered heteroaryl comprising from 1 to 3 ring heteroatoms selected from O, N, and S. In various embodiments, compound Y can have the stereochemistry as shown in compound Y1

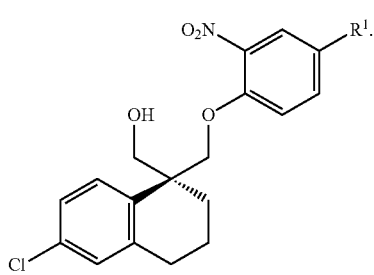
(Y1)

In various embodiments, compound Y can have the stereochemistry as shown in compound Y2

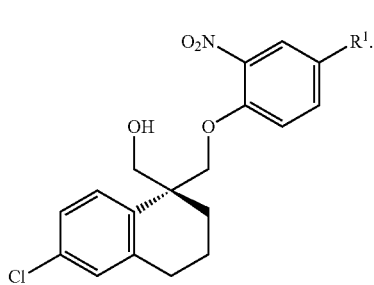
(Y2)

In various embodiments, compound Y is used to synthesize compound A3 or a salt or solvate thereof

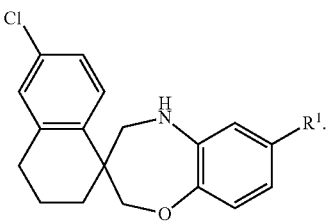
(A3)

In various embodiments, compound Y1 is used to synthesize compound A3A or a salt or solvate thereof

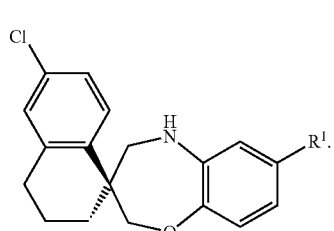
(A3A)

In various embodiments, compound Y is used to synthesize compound A3B or a salt or solvate thereof

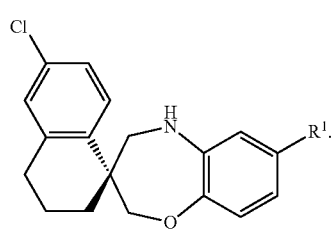
(A3B)

In various embodiments, compound Y1 is used to synthesize Compound A1 or a salt or solvate thereof

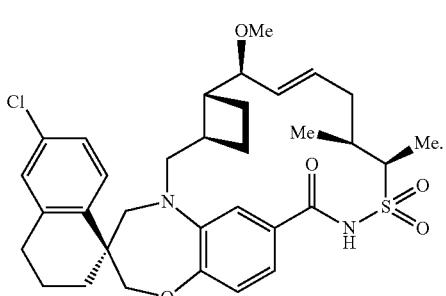
(A1)

In various embodiments, compound Y1 is used to synthesize Compound A2 or a salt or solvate thereof

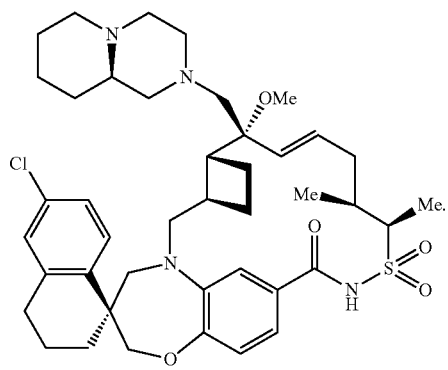

(A2)

Further aspects and advantages will be apparent to those of ordinary skill in the art from a review of the following detailed description. The description hereafter includes specific embodiments with the understanding that the disclosure is illustrative, and is not intended to limit the invention to the specific embodiments described herein.

DETAILED DESCRIPTION

Provided herein are processes for synthesizing Mcl-1 inhibitors and corresponding Mcl-1 inhibitor intermediates. In particular, the intermediates can be used in processes for synthesizing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo [14.7.2.0$^{3,6}$.0$^{19,24}$]pentacosa [8,16,18,24]tetraen]-15'-one 13',13'-dioxide (compound A1), or a salt or solvate thereof and for synthesizing (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H, 15'H-spiro[naphthalene-1,22'-[20]oxa[13]thia[1,14]diazatetracyclo [14.7.2.0$^{3,6}$.0$^{19,24}$]pentacosa[8,16,18,24]tetraen]-15'-one 13',13'-dioxide (compound A2), or a salt or solvate thereof are provided:

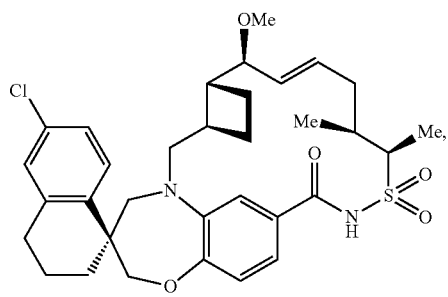

(A1)

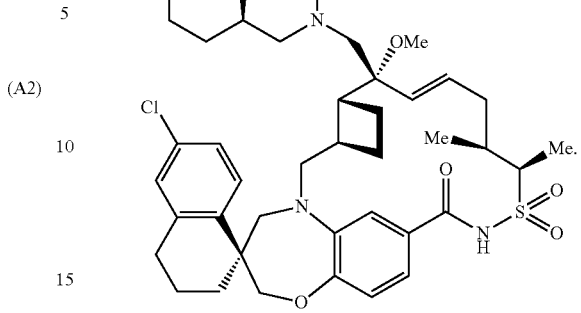

(A2)

U.S. Pat. No. 9,562,061, which is incorporated herein by reference in its entirety, discloses compound A1, or a salt or solvate thereof, as an Mcl-1 inhibitor and provides a process for preparing it. U.S. Pat. No. 9,562,061 also discloses a process of synthesizing a Mcl-1 inhibitor intermediate shown below used in the synthesis of compound A3A:

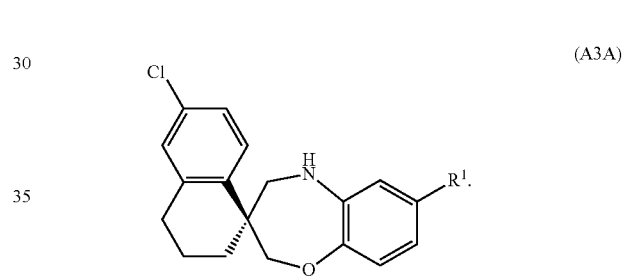

(A3A)

U.S. Pat. No. 10,300,075, which is incorporated herein by reference in its entirety, discloses compound A2, or a salt or solvate thereof, as an Mcl-1 inhibitor and provides a process for preparing it. The disclosure of compound A1 salts and solvates from U.S. Pat. No. 10,300,075 is incorporated by reference in its entirety. This patent also discloses a process of synthesizing macrocyclic Mcl-1 inhibitor intermediates such as that shown above used in the synthesis of compound A3A.

In particular, the '061 patent describes a process for synthesizing compound A3, shown in Scheme 1, below, at e.g., columns 55-63 of the '061 patent.

Scheme 1- Prior Synthesis of Compound A3A

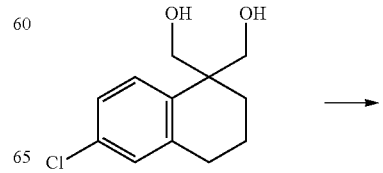

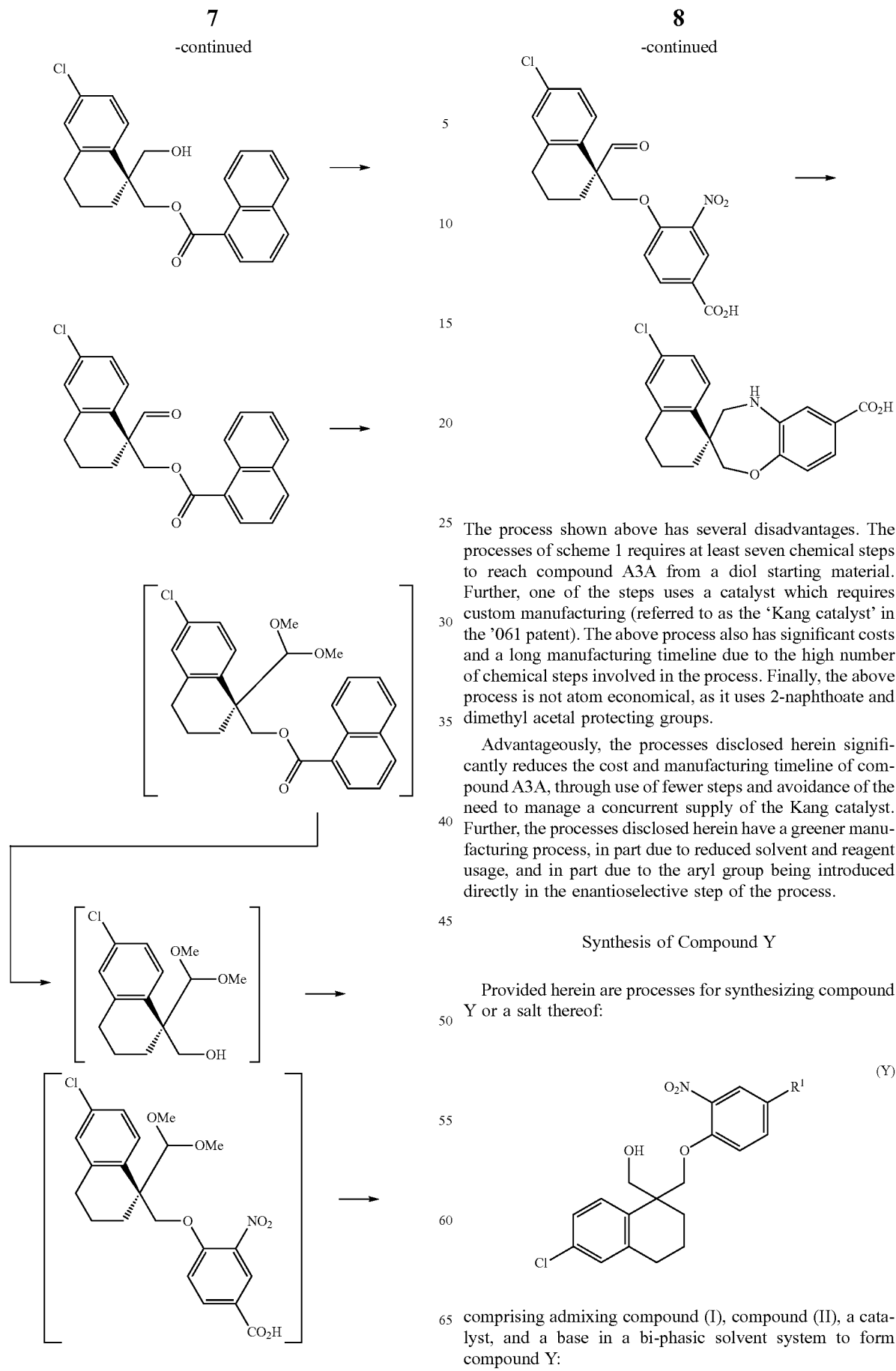

The process shown above has several disadvantages. The processes of scheme 1 requires at least seven chemical steps to reach compound A3A from a diol starting material. Further, one of the steps uses a catalyst which requires custom manufacturing (referred to as the 'Kang catalyst' in the '061 patent). The above process also has significant costs and a long manufacturing timeline due to the high number of chemical steps involved in the process. Finally, the above process is not atom economical, as it uses 2-naphthoate and dimethyl acetal protecting groups.

Advantageously, the processes disclosed herein significantly reduces the cost and manufacturing timeline of compound A3A, through use of fewer steps and avoidance of the need to manage a concurrent supply of the Kang catalyst. Further, the processes disclosed herein have a greener manufacturing process, in part due to reduced solvent and reagent usage, and in part due to the aryl group being introduced directly in the enantioselective step of the process.

Synthesis of Compound Y

Provided herein are processes for synthesizing compound Y or a salt thereof:

comprising admixing compound (I), compound (II), a catalyst, and a base in a bi-phasic solvent system to form compound Y:

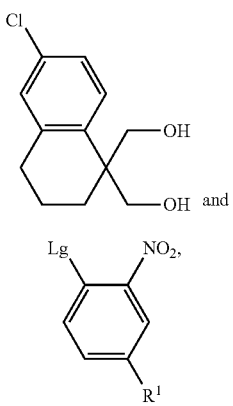

wherein $R^1$ is $CO_2C_{1-6}$alkyl, $CO_2H$, $CON(C_{1-6}alkyl)_2$, $CO_2Ar^1$, $CO_2Bn$, or CN, Lg is a leaving group, and $Ar^1$ is selected from $C_{6-22}$ aryl or a 5-12 membered heteroaryl comprising from 1 to 3 ring heteroatoms selected from O, N, and S. In various embodiments, compound Y can have the stereochemistry as shown in compound Y1

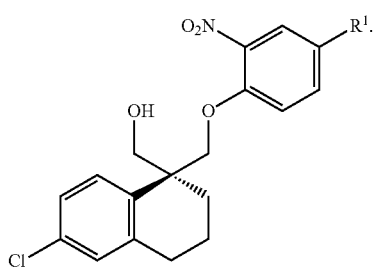

In some embodiments, compound Y can have the stereochemistry as shown in compound Y2:

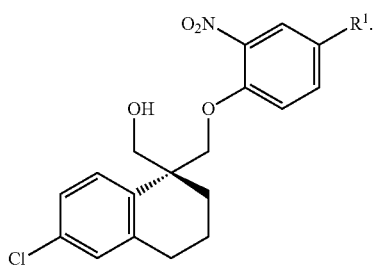

In some embodiments, the process can comprise admixing compound (I), compound (II), and the catalyst in the aprotic organic solvent prior to adding the base.

As used herein, the term "alkyl" refers to straight chained and branched saturated hydrocarbon groups containing one to twenty two carbon atoms, for example, one to twenty carbon atoms, or one to ten carbon atoms, or one to four carbon atoms. The term $C_n$ means the alkyl group has "n" carbon atoms. For example, $C_4$ alkyl refers to an alkyl group that has 4 carbon atoms. $C_{1-22}$alkyl and $C_1$-$C_{22}$ alkyl refer to an alkyl group having a number of carbon atoms encompassing the entire range (i.e., 1 to 22 carbon atoms), as well as all subgroups (e.g., 1-6, 2-20, 1-10, 3-15, 1, 2, 3, 4, 5, 6, 7, 8, 9, 10, 11, 12, 13, 14, 15, 16, 17, 18, 19, 20, 21, 22 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group. A specific substitution on an alkyl can be indicated by inclusion in the term, e.g., "haloalkyl" indicates an alkyl group substituted with one or more (e.g., one to 10) halo; or "hydroxyalkyl" indicates an alkyl group substituted with one or more (e.g., one to 10) hydroxy.

As used herein, the term "cycloalkyl" refers to an aliphatic cyclic hydrocarbon group containing five to eight carbon atoms (e.g., 5, 6, 7, or 8 carbon atoms). The term $C_n$ means the cycloalkyl group has "n" carbon atoms. For example, $C_5$ cycloalkyl refers to a cycloalkyl group that has 5 carbon atoms in the ring. $C_{5-8}$ cycloalkyl and $C_5$-$C_8$ cycloalkyl refer to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group. A cycloalkyl group can be substituted or unsubstituted.

As used herein, the term "heterocycloalkyl" is defined similarly as cycloalkyl, except the ring contains one to three heteroatoms independently selected from oxygen, nitrogen, and sulfur. In particular, the term "heterocycloalkyl" refers to a ring containing a total of three to eight atoms, of which 1, 2, 3 or three of those atoms are heteroatoms independently selected from the group consisting of oxygen, nitrogen, and sulfur, and the remaining atoms in the ring are carbon atoms. Nonlimiting examples of heterocycloalkyl groups include piperdine, tetrahydrofuran, tetrahydropyran, dihydrofuran, morpholine, and the like. Heterocycloalkyl groups can be saturated or partially unsaturated ring systems optionally substituted with, for example, one to three groups, independently selected alkyl, alkenyl, OH, $C(O)NH_2$, $NH_2$, oxo (=O), aryl, haloalkyl, halo, and OH. Heterocycloalkyl groups optionally can be further N-substituted with alkyl, hydroxyalkyl, alkylene-aryl, and alkylene-heteroaryl. The heterocycloalkyl groups described herein can be isolated or fused to another heterocycloalkyl group, a cycloalkyl group, an aryl group, and/or a heteroaryl group. When a heterocycloalkyl group is fused to another heterocycloalkyl group, then each of the heterocycloalkyl groups can contain three to eight total ring atoms, and one to three heteroatoms. In some embodiments, the heterocycloalkyl groups described herein comprise one oxygen ring atom (e.g., oxiranyl, oxetanyl, tetrahydrofuranyl, and tetrahydropyranyl).

As used herein, the term "aryl" refers to monocyclic or polycyclic (e.g., fused bicyclic and fused tricyclic) carbocyclic aromatic ring systems, having 6 to 22 ring carbon atoms. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

"Bn" refers to a benzyl group, $CH_2$phenyl, and in some cases, the phenyl can be substituted.

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur in the aromatic ring. Unless otherwise indicated, a heteroaryl group can be unsubstituted or substituted with one or more, and in particular one to four, substituents selected from, for example, halo, alkyl, alkenyl, $OCF_3$, $NO_2$, CN, NC, OH, alkoxy, amino, $CO_2H$, $CO_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring. Unless otherwise indicated, a heteroaryl group can be unsubstituted or substituted.

As used herein, the term "heterocycle" refers to either a heteroaryl or heterocycloalkyl.

In general, $R^1$ can comprise $CO_2C_{1-6}$alkyl, $CO_2H$, CON $(C_{1-6}alkyl)_2$, $CO_2Ar^1$, $CO_2Bn$, or CN. In some embodiments, $R^1$ can comprise $CO_2C_{1-6}$alkyl, $CO_2H$, or $CO_2Ar^1$. In some embodiments, $R^1$ is $CO_2H$. In some embodiments, $R^1$ is $CO_2C_{1-6}$alkyl. In some embodiments, $R^1$ is $CO_2Ar^1$. In some embodiments, $R^1$ is $CO_2Me$, $CO_2Et$, $CO_2iPr$, $CO_2nPr$, $CO_2tBu$, $CO_2nBu$, $CO_2secBu$, $CO_2Bn$, or $CO_2Ph$. In some embodiments, $R^1$ is $CO_2Me$, $CO_2Et$, $CO_2iPr$, or $CO_2tBu$. In some embodiments, $R^1$ is $CO_2Me$. In some embodiments, $R^1$ is $CO_2Ph$. In some embodiments, $R^1$ is $CO_2Bn$. In some embodiments, $CO_2Bn$ is $CO_2CH_2(p-OMeC_6H_4)$. In some embodiments, $R^1$ is CN.

In general, Lg is a leaving group. The leaving group as used herein refers to any suitable atom or functional group that can be displaced by a nucleophile upon nucleophilic aromatic substitution. Nonlimiting examples of suitable leaving groups include halides, such as F, Cl, Br, or I, or sulfonyls. In some embodiments, the leaving group is F.

In some embodiments, Lg is a sulfonyl leaving group. As used herein, the term "sulfonyl leaving group" refers to a leaving group represented by $—SO_2R'$, wherein R' can be a alkyl, aryl, haloalkyl, heteroaryl, or the like. In some embodiments, the sulfonyl leaving group is selected from the group consisting of mesyl ($SO_2Me$), tosyl ($SO_2tolyl$), nosyl ($SO_2$-nitrophenyl), and triflyl ($SO_2CF_3$). In some embodiments, the sulfonyl leaving group comprises mesyl.

In general, compound (II) is present at 0.9 to 2 molar equivalents, based upon 1.0 molar equivalents of compound (I). In some embodiments, compound (II) is present at 1 to 2 molar equivalents, 1 to 1.5 molar equivalents, or 1 to 1.2 molar equivalents, based upon 1.0 molar equivalents of compound (I). In some embodiments, compound (II) is present at 1 molar equivalent, based upon 1.0 molar equivalents of compound (I).

In general, the catalyst can be any moiety that assists in the coupling of compound (I) and (II), e.g., by reducing the activation energy, by increasing the rate, by increasing the yield, by increasing the purity profile, by increasing the enantiomeric purity of the product, by decreasing the reaction temperature required, or any other manner to facilitate formation of compound (Y), which can be, but is not always, used in a substoichiometric quantity. In some cases, the catalyst is an asymmetric catalyst. In some embodiments, the asymmetric catalyst can have a structure of

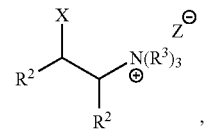

wherein each $R^2$ is independently $C_{1-22}$alkyl, $C_{5-8}$cycloalkyl, or $Ar^1$, or each $R^2$, together with the atoms to which they are attached, form a five- to eight-member cylcoalkyl; each $R^3$ is independently $C_{1-22}$alkyl, $C_{5-8}$cycloalkyl, Bn, or $Ar^1$, or two $R^3$, together with the nitrogen to which they are attached, form a five- to twenty five-member heterocycle comprising 0-1 additional ring heteroatoms selected from N, O, and S; X is OH, $NR^NC(O)RN$, $C(O)N(R^N)_2$, $N(RN)_2$, $C_{1-6}$haloalkyl, SH, $SC_{1-6}$alkyl, $NHSO_2Ar^1$, $NHSO_2C_{1-6}$alkyl, $NHSOC_{1-6}$alkyl, or $NHSOAr^1$; each $R^N$ is independently H, $C_{1-12}$alkyl, or $Ar^1$; and Z is a counterion. In some embodiments, the asymmentric catalyst can have a structure of

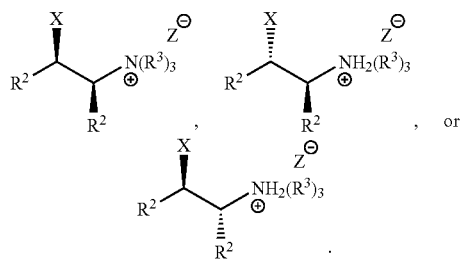

In some embodiments, the asymmetric catalyst can have a structure of

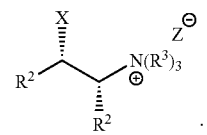

In some embodiments, the asymmetric catalyst can have a structure of

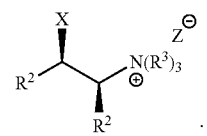

In general, each $R^2$ is independently $C_1$-$C_{22}$ alkyl, $C_5$-$C_8$ cycloalkyl, or $Ar^1$, or two $R^2$, together with the atoms to which they are attached, form a five- to eight-member cylcoalkyl. In some embodiments, at least one $R^2$ is $C_1$-$C_{22}$ alkyl. In some embodiments, at least one $R^2$ is $C_5$-$C_8$cycloalkyl. In some embodiments, at least one $R^2$ is $Ar^1$. In some embodiments, two $R^2$, together with the atoms to which they are attached, form a five- to eight-member cylcoalkyl. In some embodiments, each R² is independently selected from Me, Et, iPr, sBu, tBu, phenyl, tolyl,

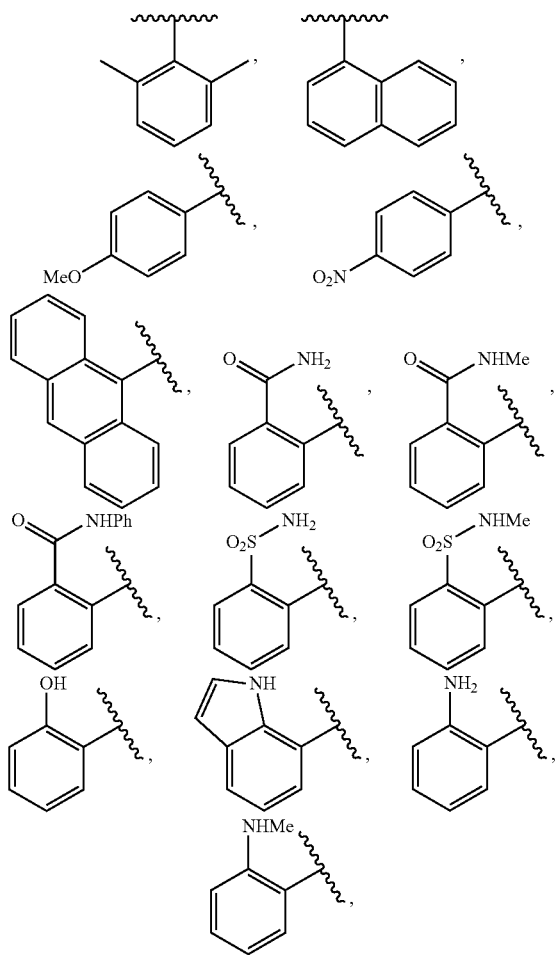

or each R², together with the atoms to which they are attached, form a cyclohexyl or a cyclopentyl.

In general, X is OH, NR$^N$C(O)R$^N$, C(O)N(R$^N$)$_2$, N(R$^N$)$_2$, SH, SC$_{1-6}$alkyl, NHSO$_2$Ar$^1$, NHS$_2$OC$_{1-6}$alkyl, NHSOC$_{1-6}$alkyl, or NHSOAr$^1$. In some embodiments, X can be OH,

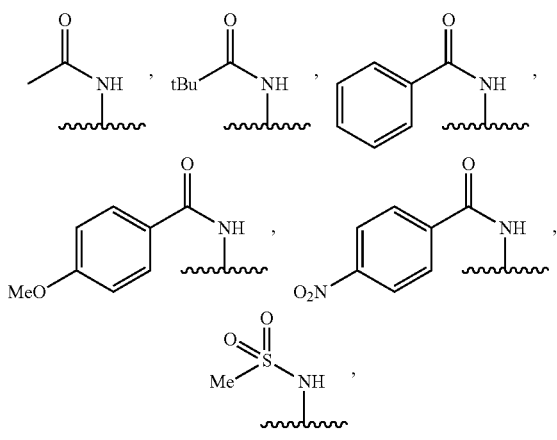

—NH—SO$_2$Me, —NH—SO$_2$(tolyl), —NH—SO$_2$(nitrophenyl),

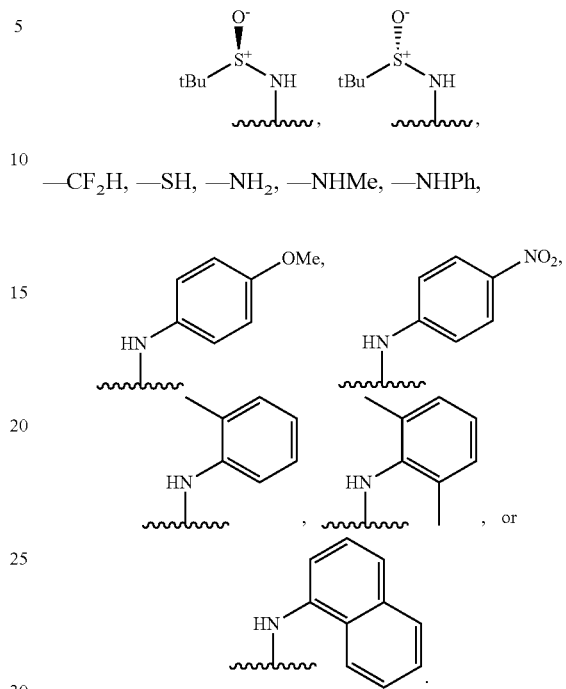

—CF$_2$H, —SH, —NH$_2$, —NHMe, —NHPh,

In some embodiments, X is OH. In some embodiments, X is SH. In some embodiments, X is NHSO$_2$(C$_{1-6}$ alkyl). In some embodiments, X is NHSO$_2$Ar$^1$. In some embodiments, X is NHSO(C$_{1-6}$ alkyl). In some embodiments, X is NHSOAr$^1$. In some embodiments, X is NR$^N$C(O)R$^N$, C(O)N(R$^N$)$_2$, or N(R$^N$)$_2$ and at least one R$^N$ is H. In some embodiments, X is NR$^N$C(O)R$^N$, C(O)N(R$^N$)$_2$, or N(R$^N$)$_2$ and at least one R$^N$ is C$_{1-6}$alkyl. In some embodiments, X is NR$^N$C(O)R$^N$, C(O)N(R$^N$)$_2$, or N(R$^N$)$_2$ and at least one R$^N$ is Ar$^1$.

In general, each R³ is independently C$_1$-C$_{22}$ alkyl, C$_5$-C$_8$ cycloalkyl, or Ar$^1$, or two R³, together with the nitrogen to which they are attached, form a five- to twenty five-member heterocycle comprising 0-1 additional ring heteroatoms selected from N, O, and S. In some embodiments, at least one R³ is C$_1$-C$_{22}$ alkyl. In some embodiments, at least two R³ are C$_1$-C$_{22}$ alkyl. In some embodiments, at least two R³ are Ar$^1$. In some embodiments, two R³, together with the nitrogen to which they are attached, form a five- to twenty five-member heterocycle comprising 0-1 additional ring heteroatoms selected from N, O, and S. In some embodiments, at least one R³ is a C$_{12}$ alkyl. In some embodiments, the asymmetric catalyst can comprise a —N(R³)$_{3+}$ that is selected from the group consisting of —NMe$_3^+$, —NMe$_2$Bn$^+$, —NMeBn$_2^+$, —NBn$_3^+$,

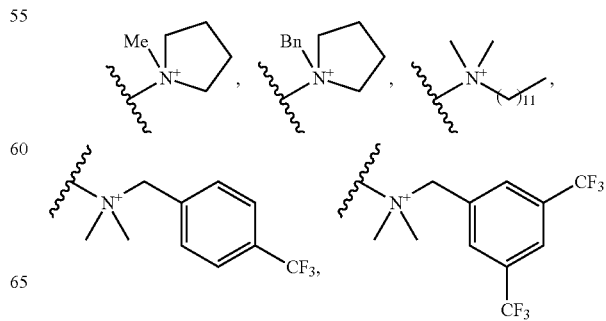

-continued
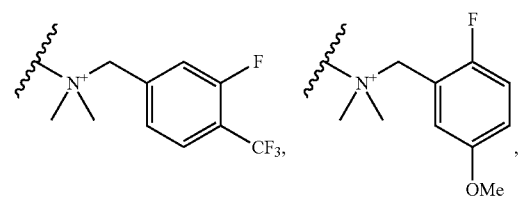
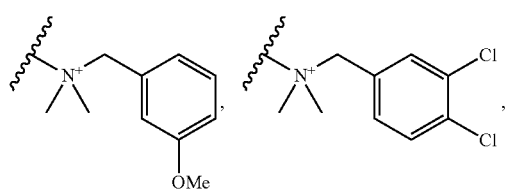
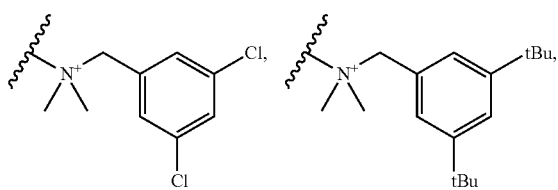
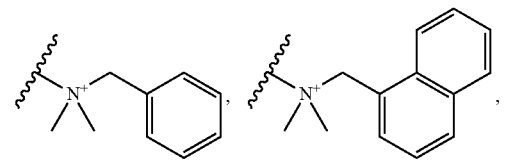
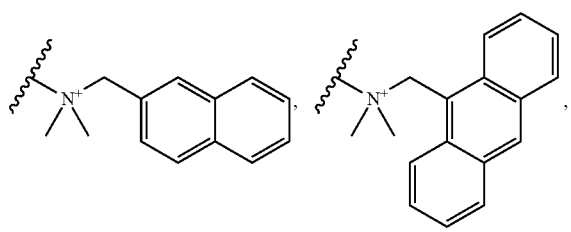
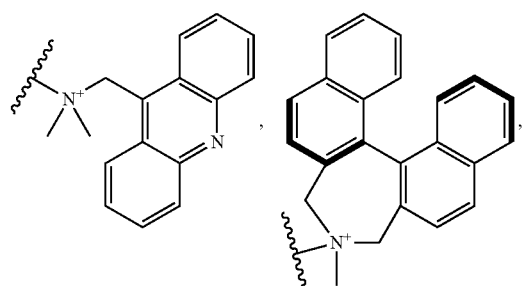
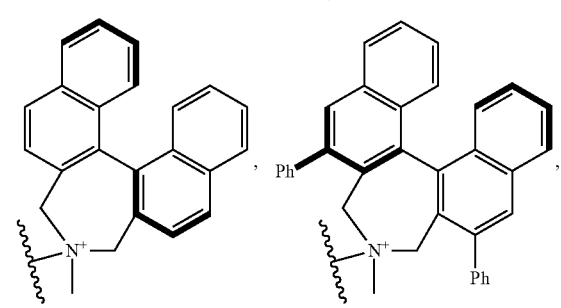
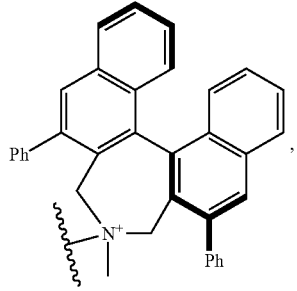
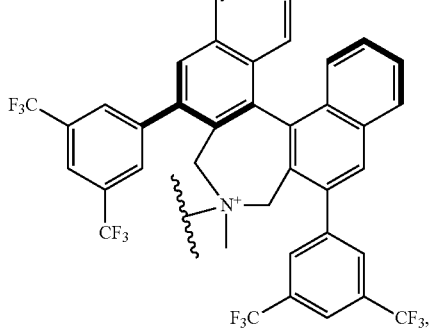
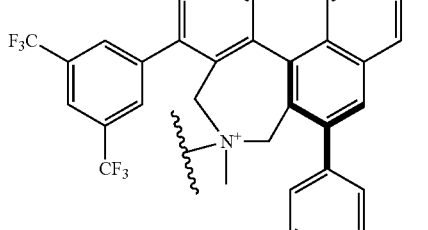
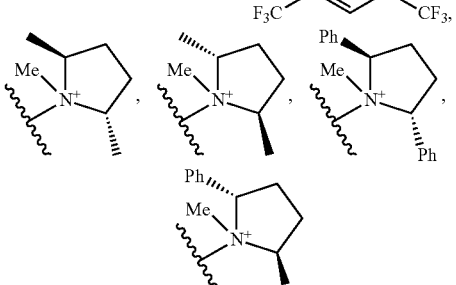
In some embodiments, the —N(R$^3$)$_3$$^+$ is
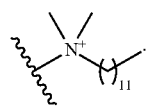
In some embodiments, the asymmetric catalyst can have a structure of

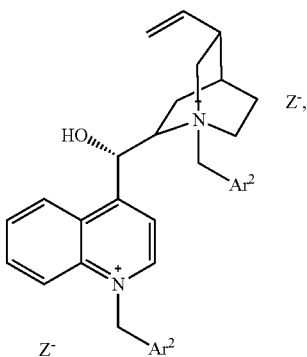

wherein each Ar² independently is selected from $C_{6-22}$ aryl or a 5-12 membered heteroaryl comprising from 1 to 3 ring heteroatoms selected from O, N, and S and Z is a counterion. In some embodiments, at least one Ar² is phenyl or substituted phenyl. In some embodiments, at least one Ar² is phenyl. In some embodiments, each Ar² is phenyl. In some embodiments, at least one Ar² is substituted phenyl. In some embodiments, each Ar² is substituted phenyl. In some embodiments, substituted phenyl can comprise one or two substituents independently selected from $C_{1-4}$alkyl, $CF_3$, Cl, Br, F, and $OC_{1-4}$ alkyl. In some embodiments, at least one Ar² is anthracenyl. In some embodiments, each Ar² is independently selected from

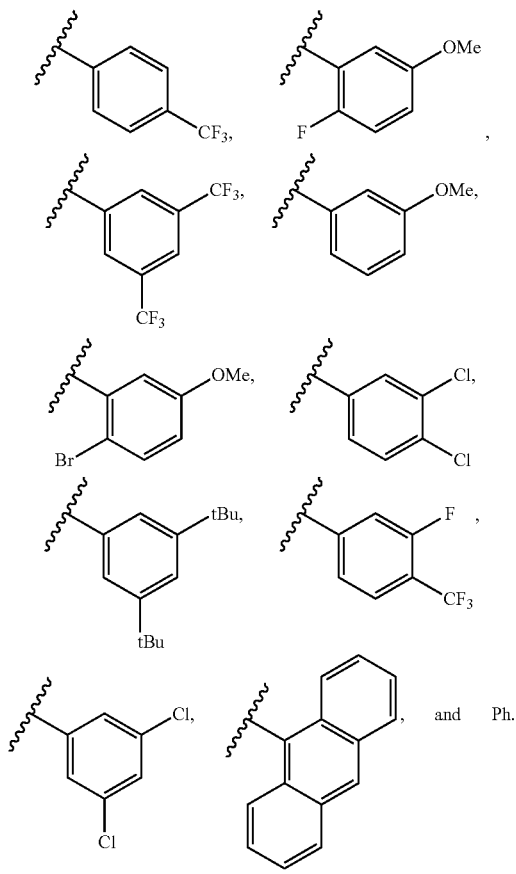

In some embodiments, the asymmetric catalyst can have a structure of

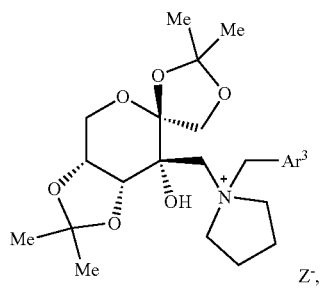

wherein Ar³ is selected from $C_{6-22}$ aryl or a 5-12 membered heteroaryl comprising from 1 to 3 ring heteroatoms selected from O, N, and S and Z is a counterion. In some embodiments, Ar³ is phenyl or substituted phenyl. In some embodiments, Ar³ is phenyl. In some embodiments, substituted phenyl can comprise one or two substituents independently selected from $C_{1-4}$alkyl, $CF_3$, Cl, Br, F, and $OC_{1-4}$ alkyl. In some embodiments, Ar³ is anthracenyl. In some embodiments, each Ar³ is selected from

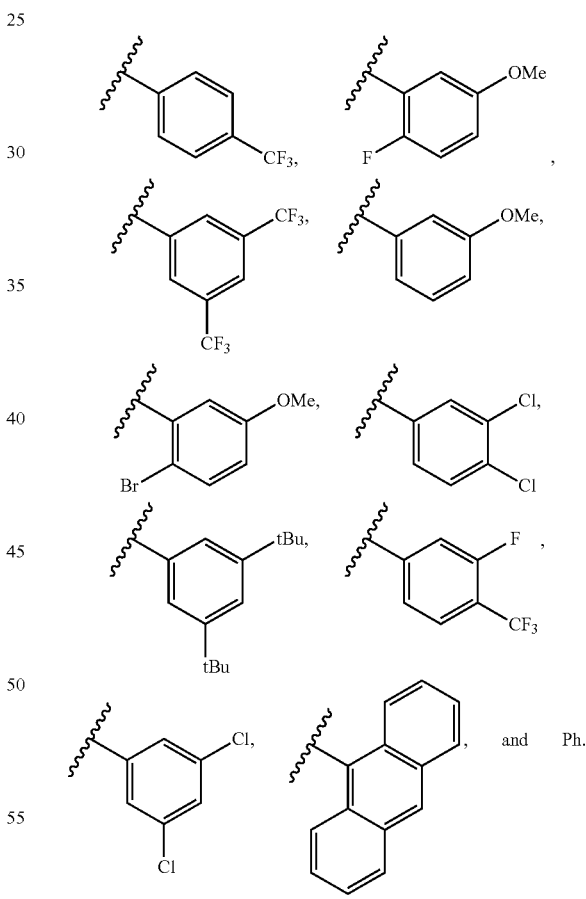

In general, Z is a counterion. In some embodiments, Z is a halide, triflate, mesylate, tosylate, or nosylate. In some embodiments, Z is $F^-$, $Cl^-$, $Br^-$, or $I^-$. In some embodiments, Z is $Br^-$ In some embodiments, the asymmetric catalyst used in the disclosed processes can be selected from the group consisting of

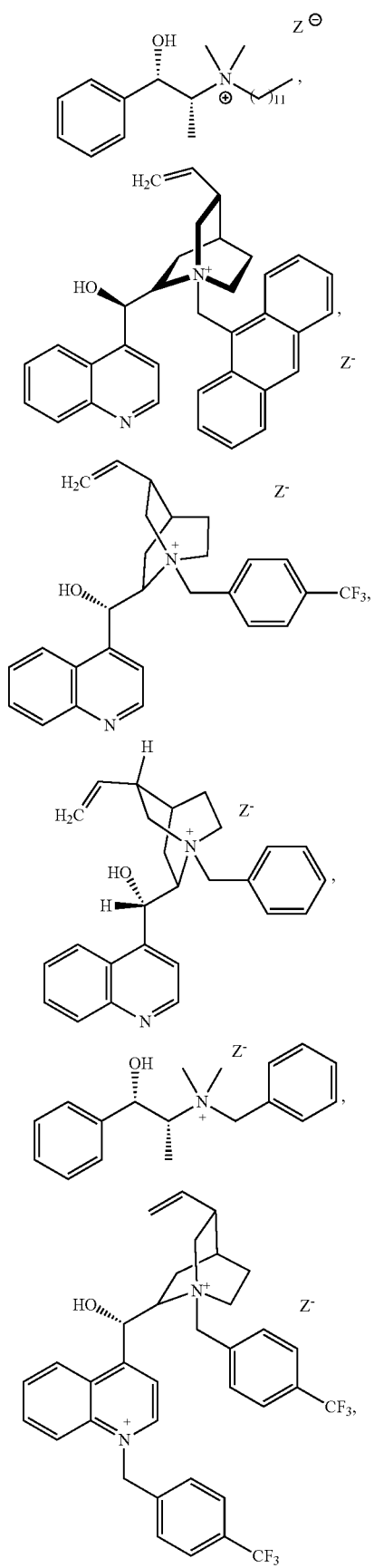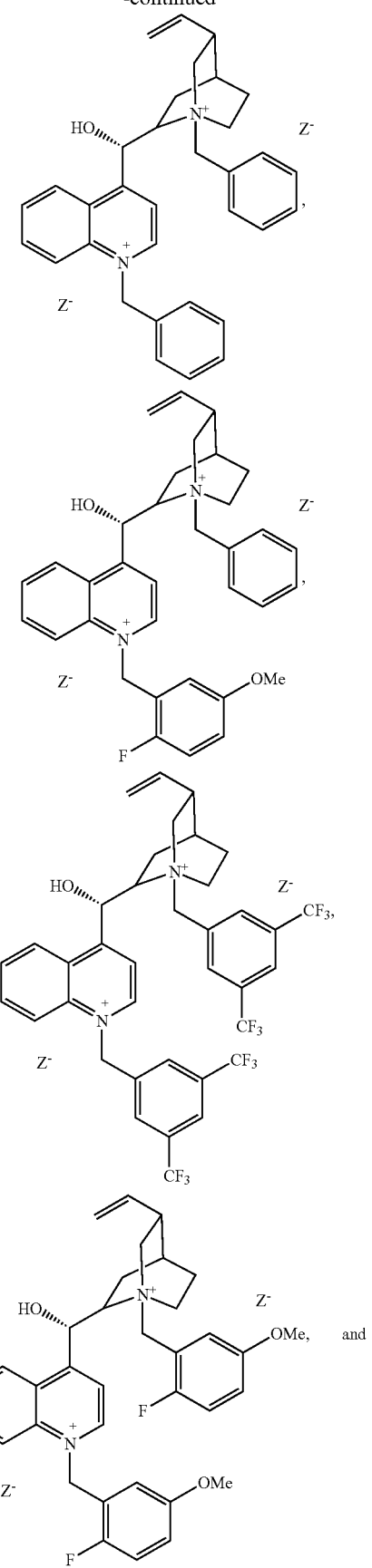

-continued

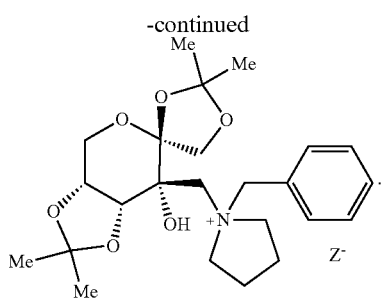

In some embodiments, the asymmetric catalyst is

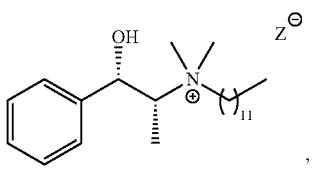

In some specific cases for the embodiments shown here, Z is bromide or chloride. In some embodiments, Z is chloride. In some embodiments, Z is bromide.

In general, the asymmetric catalyst is present at 0.005 to 1.50 molar equivalents, based upon 1.0 molar equivalents of compound (I). In some embodiments, the asymmetric catalyst is present at 0.005 to 1 molar equivalents, 0.05 to 0.5 molar equivalents, or 0.05 to 0.25 molar equivalents. For example, the asymmetric catalyst is present at 0.005, 0.01, 0.05, 0.1, 0.15, 0.2, 0.25, 0.5, 0.75, 1, 1.25, or 1.5 molar equivalents, based upon 1.0 molar equivalents of compound (I). In some embodiments, the asymmetric catalyst is present at 0.25 molar equivalents, based upon 1.0 molar equivalents of compound (I).

In general, the base can comprise an inorganic base. Contemplated inorganic bases include, but are not limited to, $Cs_2CO_3$, $K_2CO_3$, $Rb_2CO_3$, $Na_2CO_3$, $Na_2CO_3$, $Li_2CO_3$, $CaCO_3$, $MgCO_3$, $K_3PO_4$, $Na_3PO_4$, $Li_3PO_4$, $K_2HPO_4$, $Na_2HPO_4$, $Li_2HPO_4$, $NaHCO_3$, $LiHCO_3$, and $KHCO_3$. In some embodiments, the base comprises $Cs_2CO_3$. In some embodiments, the inorganic base is present at 0.95 to 6 molar equivalents, based upon 1.0 molar equivalents of compound (I). In some embodiments, the inorganic base can be present at 1 to 5 molar equivalents, 1 to 4 molar equivalents, 1 to 3 molar equivalents, 1 to 2 molar equivalents, or 1.5 molar equivalents, based upon 1.0 molar equivalents of compound (I). For example, the inorganic base can be present at 0.95, 1, 1.1, 1.2, 1.3, 1.4, 1.5, 2, 3, 4, 5, or 6 molar equivalents, based upon 1.0 molar equivalents of compound (I).

In general, the solvent system is bi-phasic. In some embodiments, the bi-phasic solvent system can comprise an aprotic organic solvent and water. Contemplated aprotic organic solvents include, but are not limited to, dichloromethane, tetrahydrofuran, toluene, benzene, cyclopentyl methyl ether, tert-butyl methyl ether, 2-methyltetrahydrofuran, anisole, xylene, benzotrifluoride, 1,2-dichloroethane, methyl isobutyl ketone, ethyl acetate, isopropyl acetate, or a combination thereof. In some embodiments, the aprotic organic solvent can comprise toluene. In some embodiments, the aprotic organic solvent is present at a concentration of 3 L/kg to 30 L/kg based upon the weight of compound (I). For example, the aprotic organic solvent is present at a concentration of 3 L/kg, 4 L/kg, 5 L/kg, 6 L/kg, 7 L/kg, 8 L/kg, 9 L/kg, 10 L/kg, 15 L/kg, 20 L/kg, 25 L/kg, or 30 L/kg. In some embodiments, the toluene is present at a concentration of 3 L/kg, to 30 L/kg based upon the weight of compound (I).

In general, the processes disclosed herein can comprise admixing at a temperature of –40° C. to 30° C. In some embodiments, the admixing occurs at a temperature of –30° C. to 30° C., –20° C. to 20° C., –20° C. to 10° C., or –20° C. to 5° C. For example, the admixing occurs at a temperature of –40° C., –30° C., –20° C., –15° C., –10° C., –5° C., 0° C., 5° C., 10° C., 20° C., or 30° C.

In general, the processes disclosed herein can comprise admixing for 1 hour to 72 hours. In some embodiments, the admixing occurs for 1 hour to 48 hours, 1 hour to 24 hours, 1 hour to 20 hours, 10 hours to 20 hours, or 14 hours to 18 hours. For example, the admixing can occur for 1 hour, 2 hours, 3 hours, 4 hours, 5 hours, 10 hours, 12 hours, 14 hours, 16 hours, 18 hours, 20 hours, 24 hours, 36 hours, 48 hours, or 72 hours.

In general, the processes disclosed herein can produce compound Y in high enantiomeric excess (e.g., 30% or more). In some embodiments, compound Y is produced with an enantiomeric excess of 30% or more. In some embodiments, compound Y is produced with an enantiomeric excess of 40% or more. In some embodiments, compound Y is produced with an enantiomeric excess of 50% or more. In some embodiments, compound Y is produced with an enantiomeric excess of 60% or more.

Synthesis of Compound A3A

Compound Y, prepared by the processes disclosed herein, can be used to synthesize compound A3A or salts thereof, as shown in Scheme 2. Compound Y can be used to synthesize compound A3A using various different methods. In some cases, compound Y, when $R^1$ is $CO_2Me$ or CN, e.g., can undergo a hydrolysis reaction, an oxidation, a hydrogenation to form compound A3A, and then a salt of compound A3A can be crystallized. In some cases, compound Y, when $R^1$ is $CO_2Me$ or CN, e.g., can undergo an oxidation, a hydrolysis reaction, a hydrogenation to form compound A3A, and then a salt of compound A3A can be crystallized. In some cases, compound Y, when $R^1$ is $CO_2Me$ or CN, e.g., can undergo a hydrogenation, a redox-neutral (hydrogen borrowing) cyclization of the aniline onto the alcohol through oxidation/reductive amination, to form compound A3A, and then a salt of compound A3A can be crystallized. In some cases, compound Y, when $R^1$ is $CO_2H$, e.g., can undergo an oxidation, a hydrogenation to form compound A3A, and then a salt of compound A3A can be crystallized.

Scheme 2- General Process for Synthesis of Compound A3A

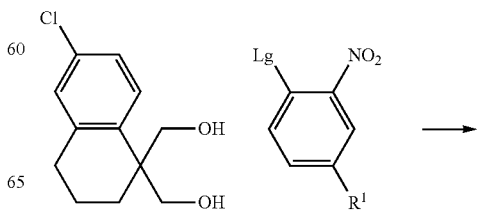

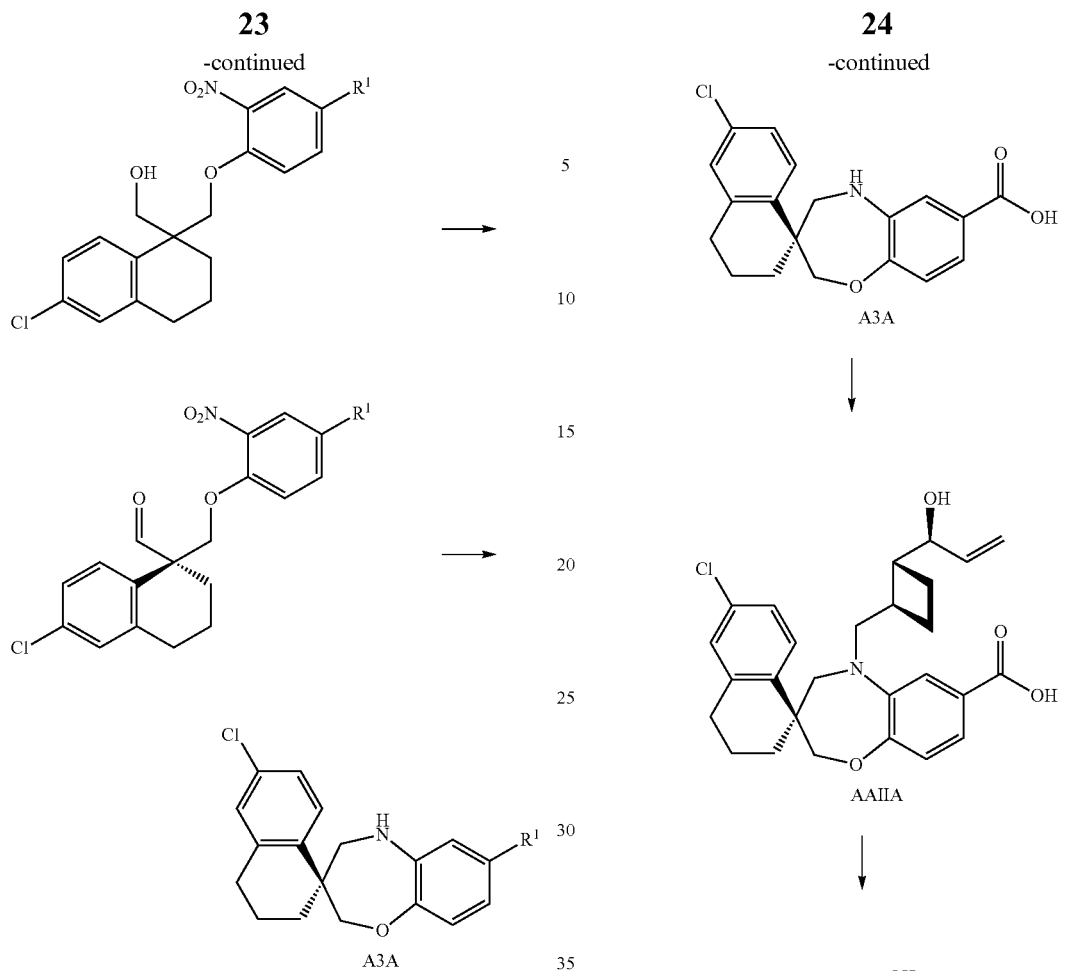

Compound Y1, prepared by the processes disclosed herein, can be used to synthesize compounds A1 and A2. As shown in Scheme 2, compound Y1 may be used to synthesize compound A3A and salts and solvates thereof. Compound Y1 can then be used, via compound A3A, to synthesize compound A1 as shown in scheme 3. As shown in Scheme 4, compound A1 may be used to synthesize compound A2 as shown in Scheme 4. It will be recognized that compound Y may be used to prepare A3 and may also be used to prepare the enantiomer of A3A and that the choice of catalysts and conditions may also be used to generate the enantiomer of compound Y1.

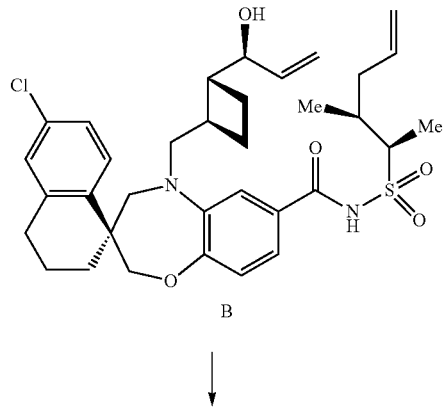

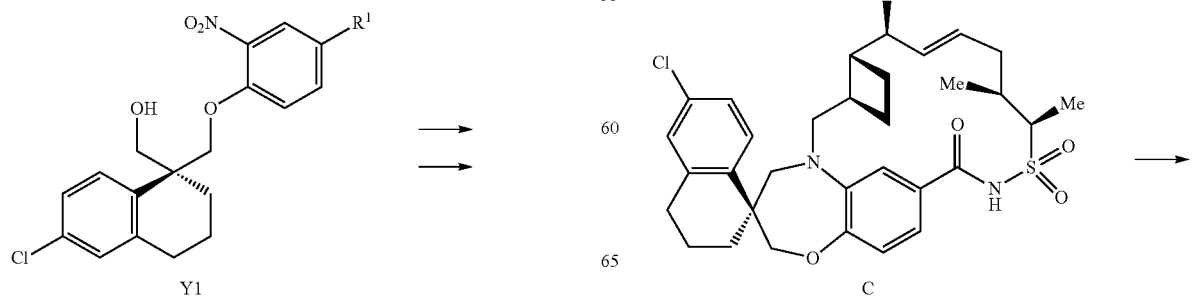

Scheme 3- Conversion of Compound A3 to Compound A1

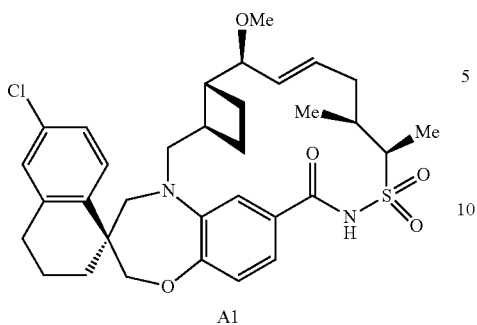
A1
As shown above and described in U.S. Pat. No. 9,562,061, compound A3A may be used to synthesize compound A1 and salts and solvates thereof. As described herein, compound Y1 may be used to prepare compound A1.
Scheme 4- Conversion of Compound A1 to Compound A2
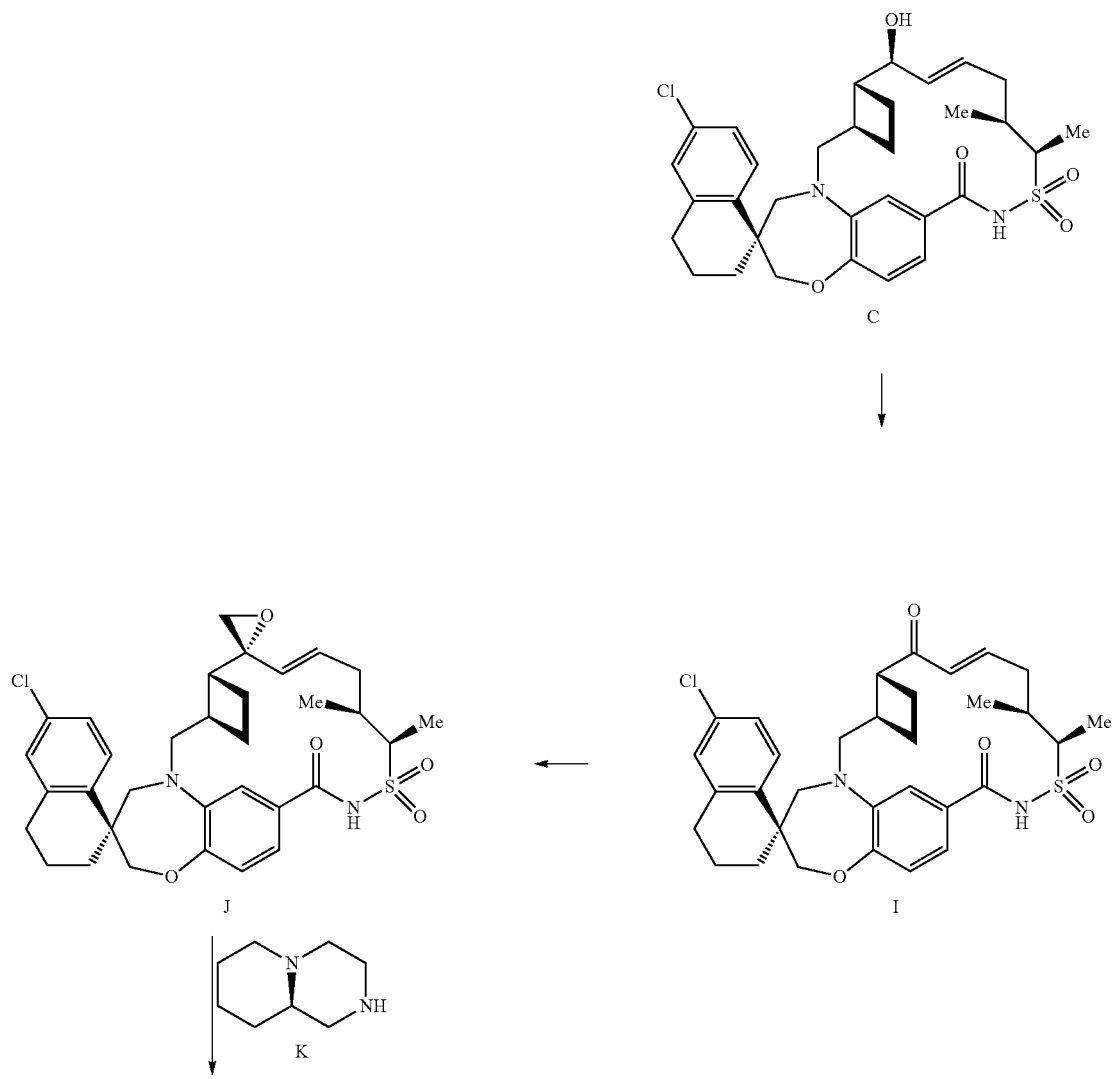

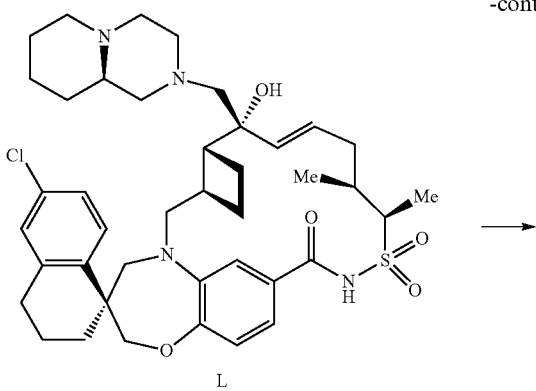

L

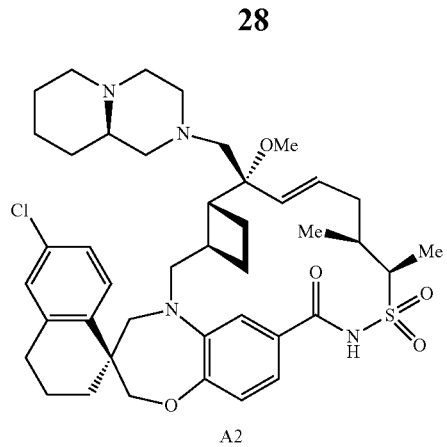

A2

As shown above and described in U.S. Pat. No. 10,300, 075, compound C may be used to synthesize compound A2 and salts and solvates thereof. Compound C can be oxidized to provide cyclic enone I as disclosed in U.S. Pat. No. 10,300,075. Enone I can then be converted to epoxide J using the procedures disclosed in U.S. Pat. No. 10,300,075. Epoxide J can then be reacted with bicyclic compound K to provide hydroxy compound L. Finally, methylation of compound L provides compound A2 as disclosed in U.S. Pat. No. 10,300,075.

It is to be understood that while the disclosure is read in conjunction with the detailed description thereof, the foregoing description and following example are intended to illustrate and not limit the scope of the disclosure, which is defined by the scope of the appended claims. Other aspects, advantages, and modifications are within the scope of the following claims.

EXAMPLES

The following examples are provided for illustration and are not intended to limit the scope of the invention.

Example 1: SNAP Reactions to Form Compound Y

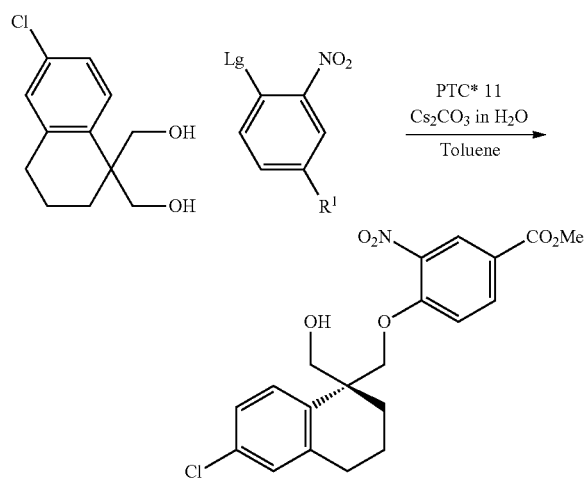

-continued

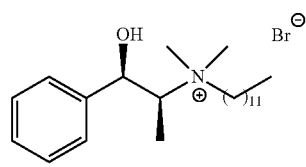

11

Synthesis of Compound Y2

Methyl (R)-4-((6-chloro-1-(hydroxymethyl)-1,2,3,4-tetrahydronaphthalen-1-yl)methoxy)-3-nitrobenzoate (Compound Y2, wherein $R^1$ is $CO_2Me$): An EasyMax reactor vessel (glass, 100 mL) was sequentially charged with [6-chloro-1-(hydroxymethyl)tetraline-1-yl]methanol (THN-DIOL, 3.00 g, 13.2 mmol, 1.0 equiv), methyl 4-fluoro-3-nitrobenzoate (2.64 g, 13.2 mmol, 1.0 equiv, wherein Lg is F and $R^1$ is methyl) and (1R,2S)-N-ethyl-1-hydroxy-N,N-dimethyl-1-phenylpropan-2-aminium bromide (11, 1.43 g, 3.31 mmol, 0.25 equiv). The vessel was placed into the EasyMax Advanced Synthesis Workstation and was sealed with a six-port reactor head equipped with an overhead stirrer, nitrogen (N2) inlet line, temperature probe, and baffle to aid mixing. The reactor was charged with toluene (82.5 mL, 27.5 volumes, 0.15 M relative to THN-DIOL) and the remaining ports were sealed with rubber septa. The reaction mixture was stirred (overhead, 800 rpm), which resulted in an off-white, slightly heterogenous solution (fine particulates). The reaction mixture was cooled (Temperature of the jacket was −20.0° C.) until the internal temperature reached −17.0° C. At this time, aqueous cesium carbonate (4.54 mL, 13.2 mmol, 1.0 equiv, 50 wt % aq. solution) was added to the reaction mixture via syringe (dropwise, 2 min) through a septum. Upon addition of the base, the reaction mixture turned a light yellow color. The solution was left to stir for 16 h (Temperature of the jacket was −20.0° C.). After this time, the stirring was stopped, the mixture was warmed (5° C.), and the yellow reaction mixture was transferred to a separatory funnel (250 mL). An aliquot of this solution was removed for LC analysis. Water (30 mL, 10 volumes) was added to the separatory funnel and the mixture was gently shaken and vented. The biphasic mixture was left to settle (10 min) and the phases were separated. Following LC analysis of both phases, the organic layer was concentrated with the aid of a rotary evaporator to give a thick yellow oil. This crude reaction mixture was purified by automated column chromatography on silica gel (Biotage, 340 g column, 5-40% EtOAc in heptane gradient, 16 column volumes) to afford Compound Y2, wherein $R^1$ is $CO_2Me$, as a slightly yellow glassy solid (0.930 g, 17.3% yield, 54% ee).

$^1$H NMR (500 MHz, CDCl3) δ (ppm)=8.53 (d, J=2.1 Hz, 1H), 8.18 (dd, J=2.2, 8.7 Hz, 1H), 7.51 (d, J=8.3 Hz, 1H), 7.16-7.10 (m, 3H), 4.34-4.21 (m, 2H), 4.01-3.96 (m, 1H), 3.94 (s, 3H), 3.90-3.82 (m, 1H), 2.79 (s, 2H), 2.38 (br s, 1H), 2.03-1.92 (m, 2H), 1.91-1.74 (m, 2H). $^{13}$C NMR (126 MHz, CDCl3) δ (ppm)=164.9, 155.5, 140.4, 138.9, 135.6, 135.5, 132.7, 129.3, 129.1, 127.5, 126.3, 122.8, 114.1, 74.5, 67.6, 52.5, 30.2.

Although compound Y1 was not synthesized above, the chemical reaction was intended to prove the development of the asymmetric nucleophilic aromatic substitution with this catalyst. Without intending to be bound by theory, using the enantiomer of the asymmetric catalyst 11 is thought to be able to produce compound Y1.

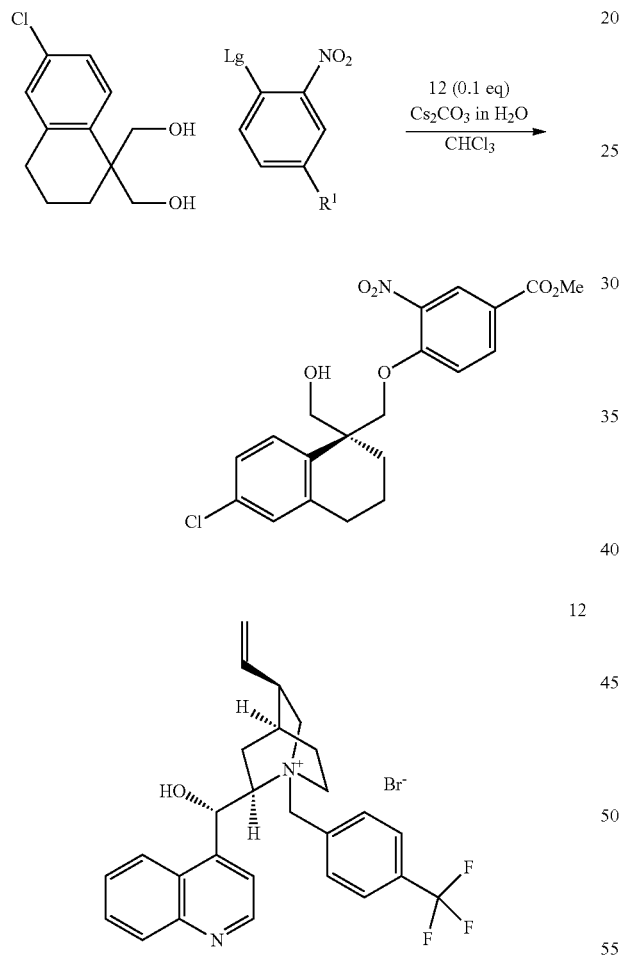

Synthesis of Y1

Methyl (S)-4-(6-chloro-1-(hydroxymethyl)-1,2,3,4-tetrahydronaphthalen-1-yl)methoxy)-3-nitrobenzoate (Compound Y1, wherein $R^1$ is $CO_2Me$): To a vial was charged N-[4-(Trifluoromethyl)Benzyl]Cinchoninium Bromide (0.10 eq, 6.7 mg), [6-chloro-1-(hydroxymethyl)tetraline-1-yl]methanol (THN-DIOL, 1.0 eq, 23 mg), methyl 4-fluoro-3-nitrobenzoate (1.0 eq, 20 mg, wherein Lg is F and $R^1$ is methyl) and CHCl3 (167 μL). The vial was cooled to +1° C. and cesium carbonate (50 wt % solution, 1 eq) was charged. The vial was shaken for 16 hr and then quench with 1 N HCl (50 μL). HPLC analysis indicated that the title compound (Y1) was formed in 32% conversion, 32% ee.

Example 2—Hydrolysis and Oxidation of Compound Y, e.g., Y1

Hydrolysis Reaction

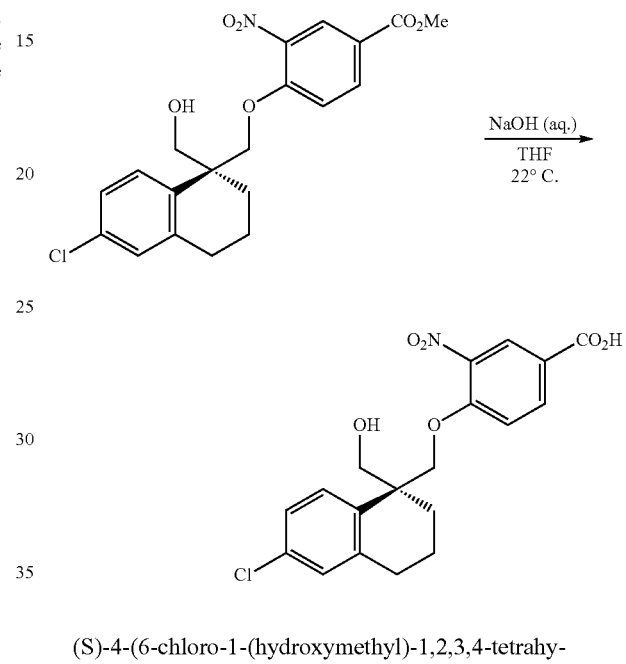

(S)-4-(6-chloro-1-(hydroxymethyl)-1,2,3,4-tetrahydronaphthalen-1-yl)methoxy)-3-nitrobenzoic acid (Compound Y1, wherein $R^1$ is $CO_2H$): To a 100 mL EasyMax reactor was charged with solid compound Y1, wherein $R^1$ is $CO_2Me$ (2.00 g, 4.93 mmol, 1.0 equiv.) and THF (20.0 mL, 10 V). The reactor was sealed with a six-port reactor head equipped with an overhead stirrer, $N_2$ inlet, and a temperature probe. A 5N aqueous solution of sodium hydroxide (4.93 mL, 24.6 mmol, 5.0 equiv.) was added gradually via syringe, maintaining the internal reaction temperature between 22-25° C. The reaction mixture was stirred at 22° C. for 23 hours, at which time the pH was adjusted to pH 1 using 6N aqueous HCl (5 mL). The reaction mixture was transferred to a separatory funnel, and the layers were separated. The aqueous layer was extracted with 2-MeTHF (15 mL), and the combined organic extracts were washed with $H_2O$ (20 mL), dried over $MgSO_4$, filtered and concentrated in vacuo. The residue was taken up in a small amount of DCM and concentrated to remove excess 2-MeTHF. Crude compound Y1, wherein $R^1$ is $CO_2H$ was obtained as a white solid (1.72 g, 87% w/w, 96% yield).

$^1$H NMR (500 MHz, DMSO-$d_6$): δ13.28 (br s, 1H), 8.38 (d, J=2.2 Hz, 1H), 8.18 (dd, J=2.2, 8.8 Hz, 1H), 7.62 (d, J=8.4 Hz, 1H), 7.51 (d, J=9.0 Hz, 1H), 7.20-7.19 (m, 1H), 7.17 (d, J=8.5 Hz, 1H), 4.94 (br s, 1H), 4.35 (dd, J=9.5, 27.5 Hz, 2H), 3.67-3.64 (m, 2H), 2.76 (t, J=6.2 Hz, 2H), 1.96-1.73 (m, 4H); 130 NMR (126 MHz, DMSO-$d_6$): δ166.3, 155.8, 141.6, 139.6, 137.7, 136.2, 131.6, 130.7, 129.2, 127.1, 126.2, 123.7, 116.1, 74.9, 66.4, 30.7, 28.5, 19.3.

Oxidation Reaction

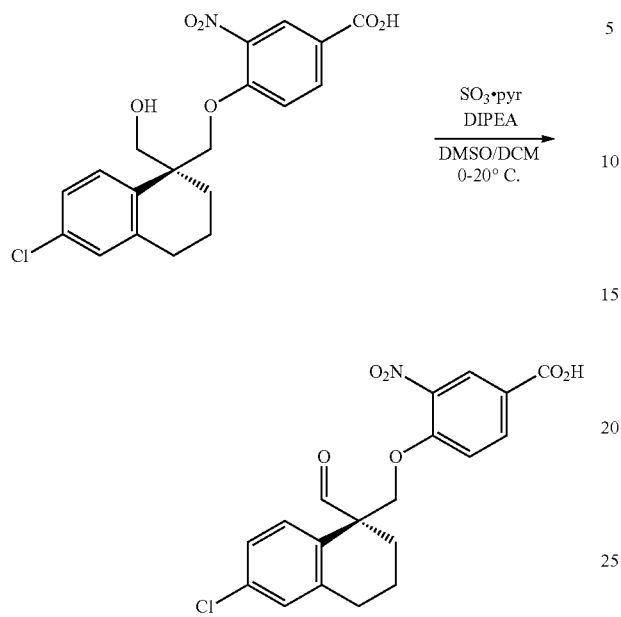

(R)-4-((6-chloro-1-formyl-1,2,3,4-tetrahydronaphthalen-1-yl)methoxy)-3-nitrobenzoic acid: A 100 mL EasyMax reactor equipped with an overhead stirrer, temperature probe, and $N_2$ inlet was charged with compound Y1, wherein $R^1$ is $CO_2H$, (1.85 g, 4.72 mmol, 1.00 equiv.) and DCM (9.25 mL, 5.0 V). To this slurry was added N,N-diisopropylethylamine (3.05 mL, 23.6 mmol, 5.0 equiv). The resulting clear yellow solution was cooled to 0° C. Dimethyl sulfoxide (DMSO) (5.55 mL, 3.0 V) was added gradually via syringe, followed by $SO_3$-pyridine (1.88 g, 11.8 mmol, 2.50 equiv.) in three portions. Following addition, the reaction was warmed to 20° C. over 1 hour and stirred for 2 hours at 20° C. Reaction was then cooled to 0° C. and acidified to pH 3 by the addition of a 10% aqueous solution of $NaHSO_4$ (15 mL). The mixture was transferred to a separatory funnel, and the layers were separated. The aqueous layer was extracted with DCM (15 mL), and the combined organic extracts were washed with brine, dried over $MgSO_4$, filtered and concentrated in vacuo. The crude residue was taken up in 2.5 V acetic acid, and 1.5 V $H_2O$ was added dropwise. The resulting slurry was aged for 1 hour, then filtered, washing with additional $H_2O$. A light brown solid was obtained, which was contaminated with excess diisopropylethylamine. The solid was re-slurried in $H_2O$ (5 mL), aged for 2.5 hours, and filtered, rinsing with additional $H_2O$. Compound Y1, wherein $R^1$ is $CO_2H$ was obtained as a white powder (1.18 g, 90.5% w/w, 67% yield).

$^1$H NMR (500 MHz, DMSO-$d_6$): δ9.63 (s, 1H), 8.30 (d, J=2.1 Hz, 1H), 8.12 (dd, J=2.2, 8.8 Hz, 1H), 7.50 (d, J=9.0 Hz, 1H), 7.30 (d, J=8.4 Hz, 1H), 7.28-7.24 (m, J=2.1 Hz, 1H), 7.24-7.20 (m, 1H), 4.73 (d, J=9.6 Hz, 1H), 4.44 (d, J=9.6 Hz, 1H), 2.74 (t, J=6.2 Hz, 2H), 2.16 (ddd, J=3.2, 9.2, 13.1 Hz, 1H), 1.96 (ddd, J=3.0, 8.4, 13.8 Hz, 1H), 1.86-1.77 (m, 1H), 1.77-1.68 (m, 1H); 130 NMR (126 MHz, DMSO-$d_6$): δ201.8, 166.2, 155.1, 142.0, 139.6, 136.1, 133.1, 131.5, 130.9, 130.2, 127.1, 126.9, 124.3, 116.4, 73.2, 53.8, 29.9, 26.4, 18.9.

What is claimed is:

1. A process for synthesizing compound Y, or a salt thereof:

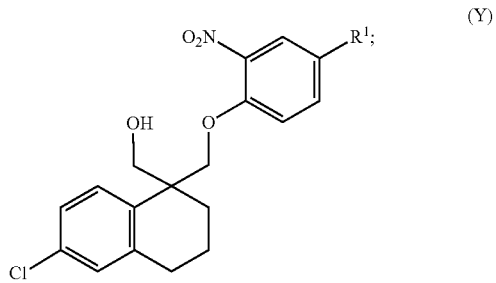

comprising:
admixing compound (I), compound (II), a catalyst, and a base in a bi-phasic solvent system to form compound Y:

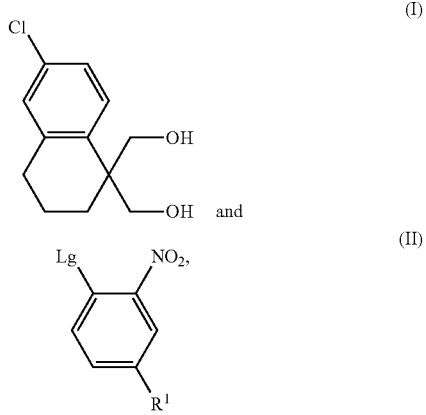

wherein $R^1$ is $CO_2C_{1-6}$alkyl, $CO_2H$, $CON(C_{1-6}alkyl)_2$, $CO_2Ar^1$, $CO_2Bn$, or CN;

Lg is a leaving group; and $Ar^1$ is $C_{6-22}$aryl or a 5-12 membered heteroaryl comprising 1 to 3 ring heteroatoms selected from O, N, and S.

2. The process of claim 1, wherein compound Y has the stereochemistry as shown in compound Y1

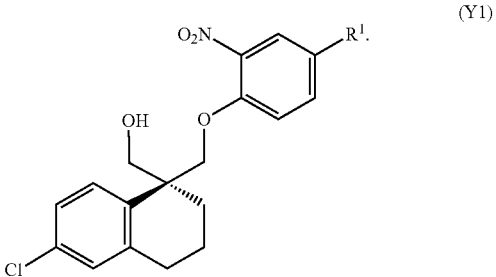

or as shown in compound Y2

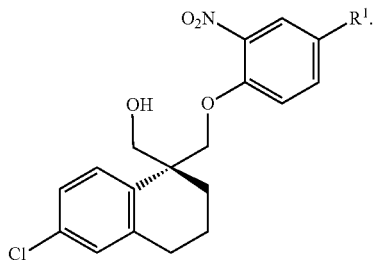

(Y2)

3. The process of claim 1, wherein R¹ is —CO₂Me, —CO₂Et, —CO₂iPr, —CO₂nPr, —CO₂tBu, —CO₂nBu, —CO₂secBu, CO₂Bn, CO₂Ph, CN, or —CO₂H.

4. The process of claim 1, wherein Lg is F, Cl, Br, I, mesyl, tosyl, nosyl, or triflyl.

5. The process of claim 1, wherein the catalyst is an asymmetric catalyst, and the asymmetric catalyst has a structure of

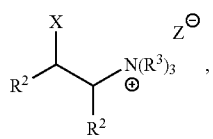

wherein
  each $R^2$ is independently $C_{1-22}$alkyl, $C_{5-8}$cycloalkyl, or $Ar^1$, or
  each $R^2$, together with the atoms to which they are attached, form a five-to eight-member cycloalkyl;
  each $R^3$ is independently $C_{1-22}$alkyl, $C_{5-8}$cycloalkyl, Bn, or $Ar^1$, or
  two $R^3$, together with the nitrogen to which they are attached, form a five-to twenty five-member heterocycle comprising 0-1 additional ring heteroatoms selected from N, O, and S;
  X is OH, $NR^NC(O)R^N$, $C(O)N(R^N)_2$, $N(R^N)_2$, $C_{1-6}$haloalkyl, SH, $SC_{1-6}$alkyl, $NHSO_2Ar^1$, $NHSO_2C_{1-6}$alkyl, $NHSOC_{1-6}$alkyl, or $NHSOAr^1$;
  each $R^N$ is independently H, $C_{1-12}$alkyl, or $Ar^1$; and
  Z is a counterion.

6. The process of claim 5, wherein the asymmetric catalyst has a structure of

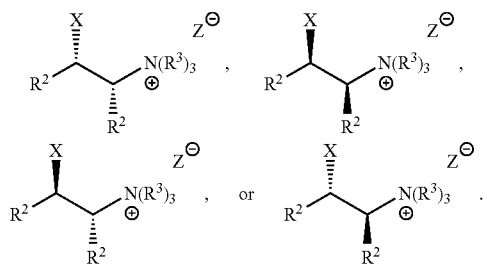

7. The process of claim 5, wherein:
each $R^2$ is independently selected from Me, Et, iPr, sBu, tBu, phenyl, tolyl,

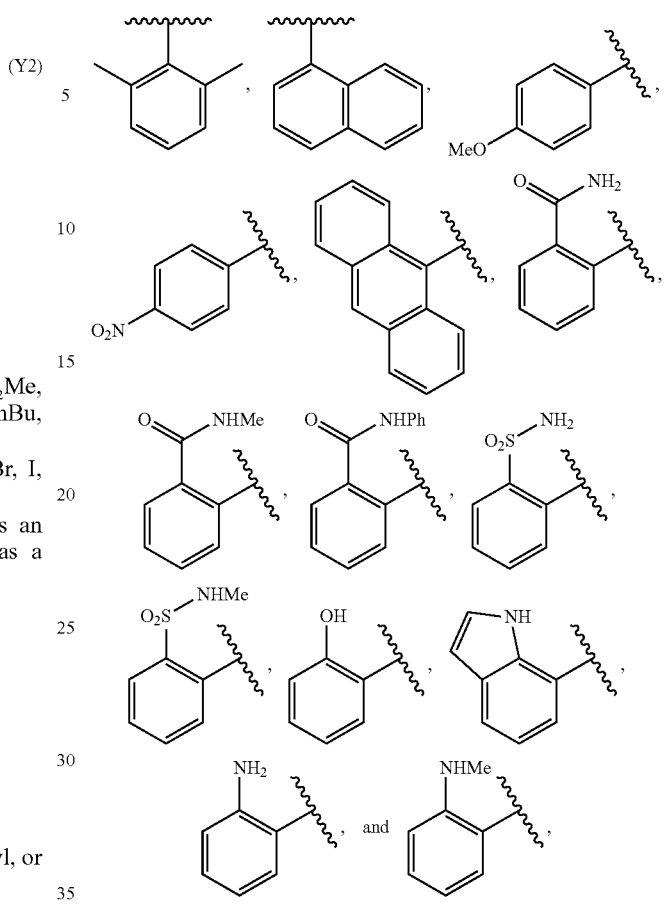

or each $R^2$, together with the atoms to which they are attached, form a cyclohexyl or a cyclopentyl;

X is

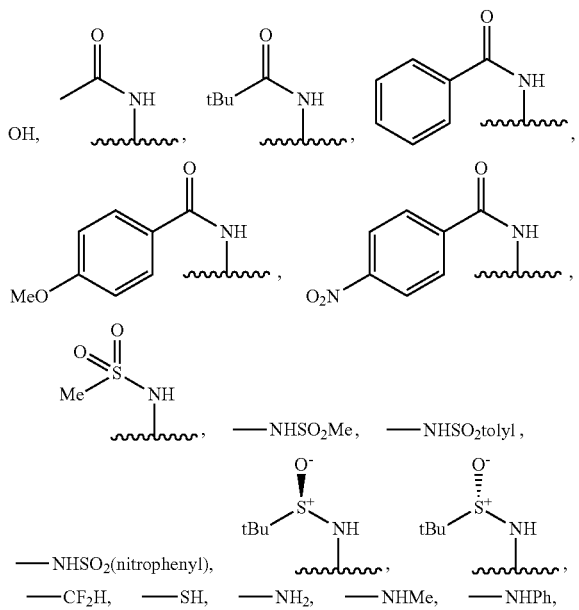

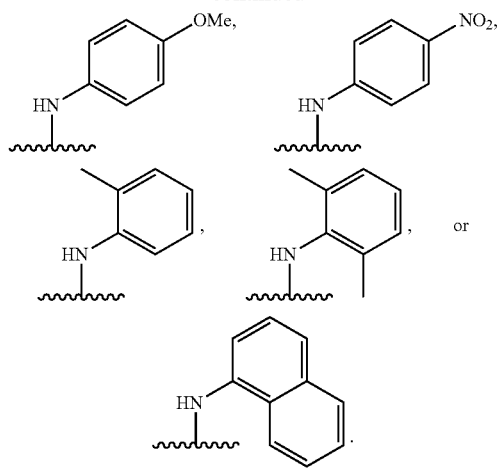
and
the asymmetric catalyst comprises a —N(R³)₃⁺ that is selected from the group consisting of
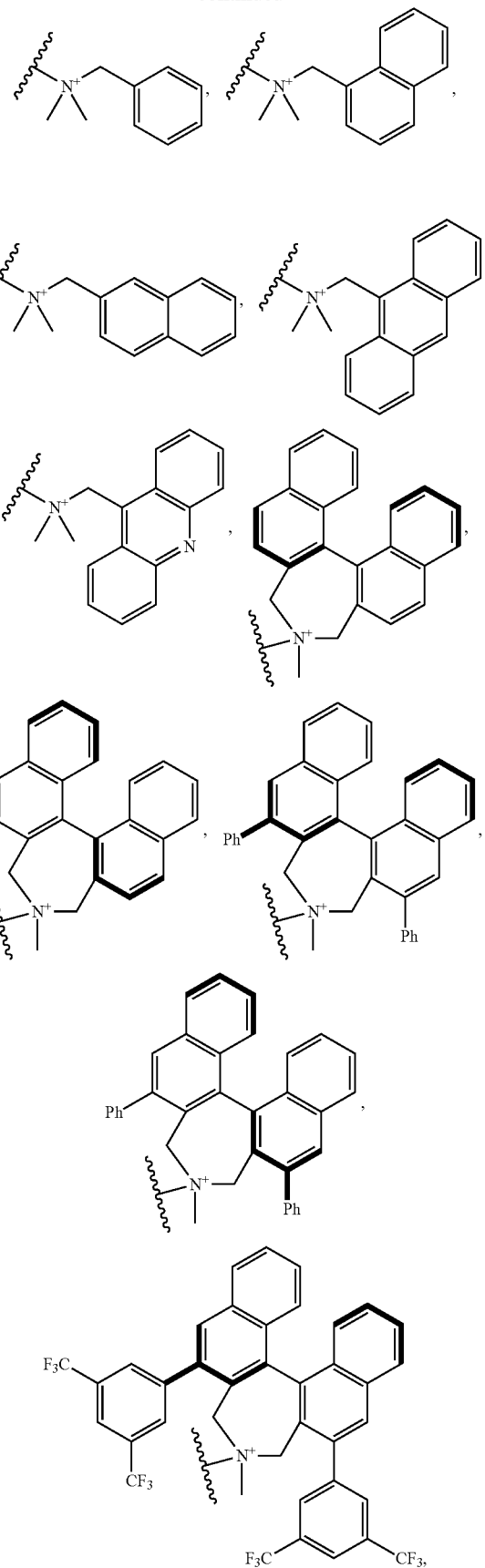

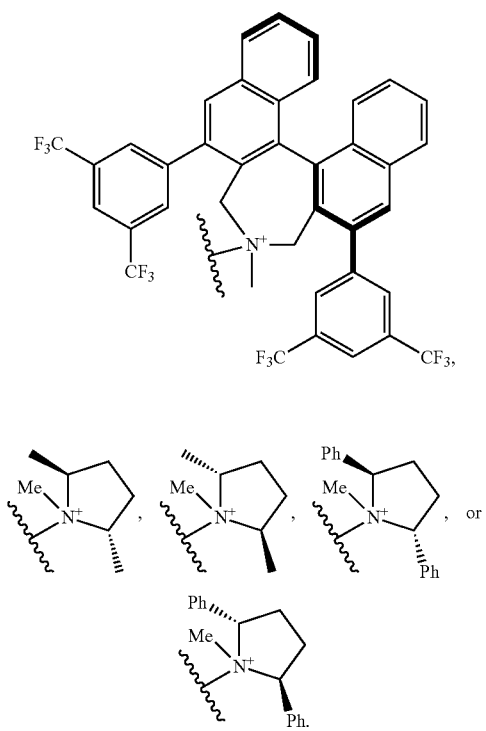

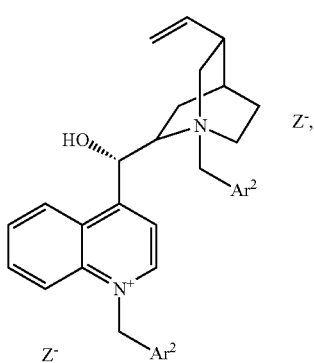

8. The process of claim 5, wherein the asymmetric catalyst has a structure of

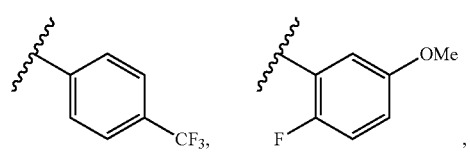

wherein each $Ar^2$ independently is selected from $C_{6-22}$ aryl or a 5-12 membered heteroaryl comprising from 1 to 3 ring heteroatoms selected from O, N, and S and Z is a counterion.

9. The process of claim 8, wherein at least one $Ar^2$ is phenyl or substituted phenyl.

10. The process of claim 9, wherein each $Ar^2$ is independently selected from

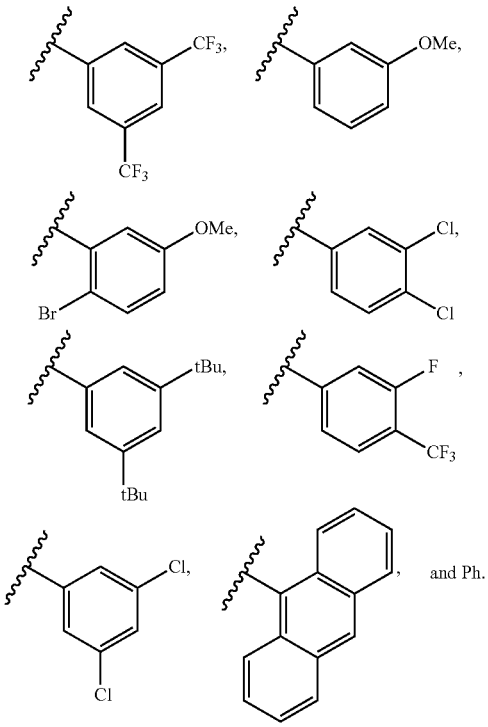

11. The process of claim 5, wherein the asymmetric catalyst has a structure of

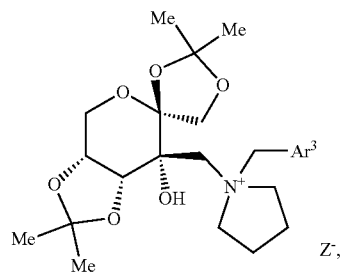

wherein $Ar^3$ is selected from $C_{6-22}$ aryl or a 5-12 membered heteroaryl comprising from 1 to 3 ring heteroatoms selected from O, N, and S and Z is a counterion.

12. The process of claim 11, wherein $Ar^3$ is phenyl or substituted phenyl.

13. The process of claim 12, wherein $Ar^3$ is selected from

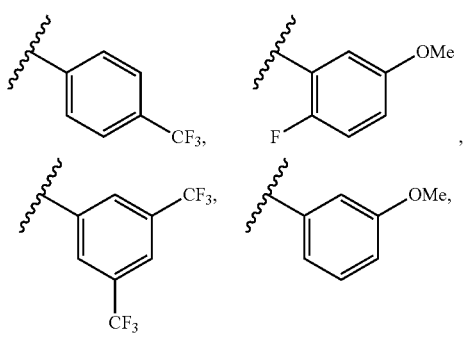

-continued
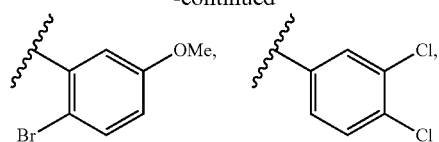
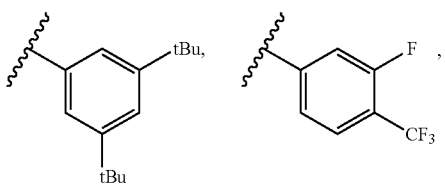
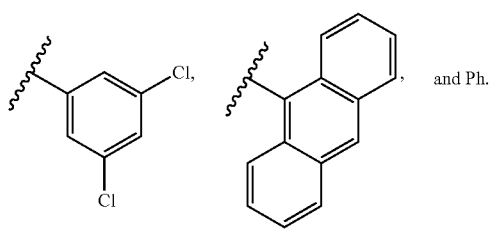
14. The process of claim 5, wherein the asymmetric catalyst is selected from the group consisting of
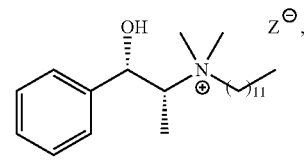
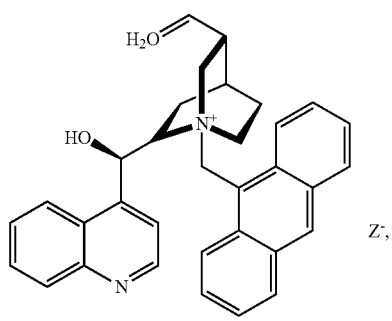
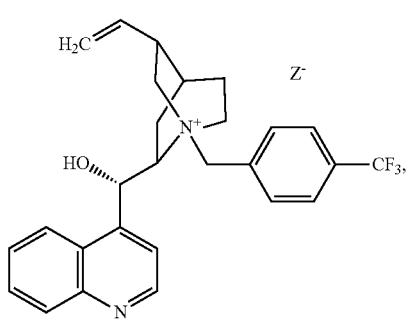
-continued
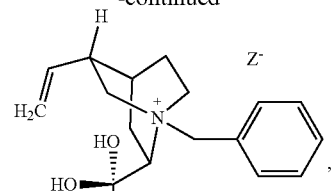
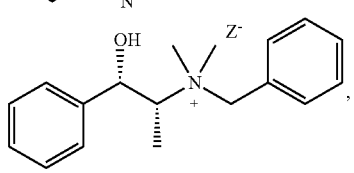
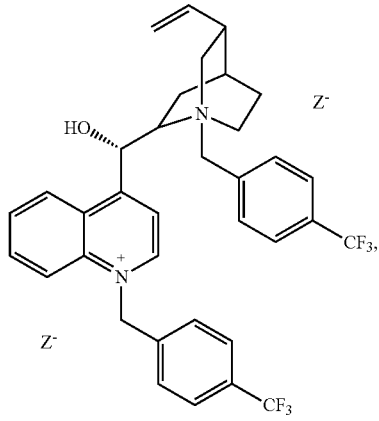
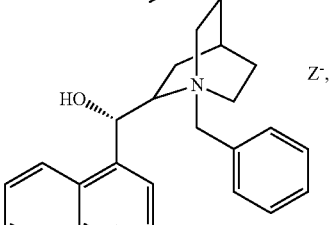
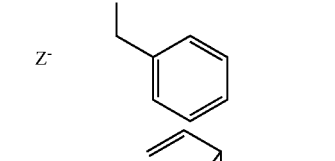
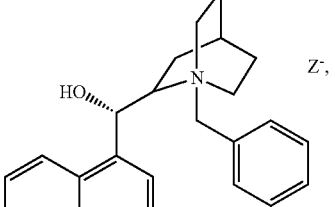
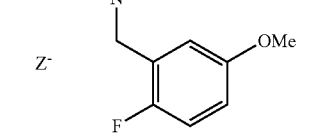

-continued

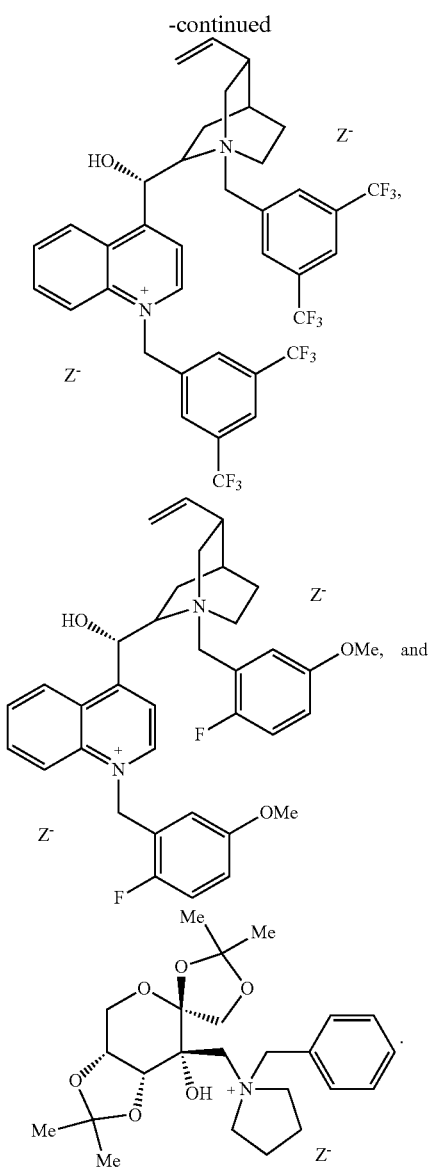

15. The process of claim 5, wherein Z is a halide, triflate, mesylate, tosylate, or nosylate.

16. The process of claim 1, wherein the base comprises an inorganic base, and the inorganic base comprises $Cs_2CO_3$, $K_2CO_3$, $Rb_2CO_3$, $Na_2CO_3$, $Na_2CO_3$, $Li_2CO_3$, $CaCO_3$, $MgCO_3$, $K_3PO_4$, $Na_3PO_4$, $Li_3PO_4 \cdot K_2HPO_4$, $Na_2HPO_4$, $Li_2HPO_4$, $NaHCO_3$, $LiHCO_3$, or $KHCO_3$.

17. The process of claim 16, wherein the inorganic base is present at 0.95 to 6 molar equivalents, based upon 1.0 molar equivalents of compound (I).

18. The process of claim 1, wherein the bi-phasic solvent system comprises an aprotic organic solvent and water, and the aprotic organic solvent comprises dichloromethane, tetrahydrofuran, toluene, benzene, cyclopentyl methyl ether, tert-butyl methyl ether, 2-methyltetrahydrofuran, anisole, xylene, benzotrifluoride, 1,2-dichloroethane, methyl isobutyl ketone, ethyl acetate, isopropyl acetate, or a combination thereof.

19. The process of claim 18, wherein the aprotic organic solvent comprises toluene, and the toluene is present at a concentration of 3 L/kg to 30 L/kg based upon weight of compound (I).

20. The process of claim 18, comprising admixing compound (I), compound (II), and the catalyst in the aprotic organic solvent prior to adding the base.

21. The process of claim 1, wherein the admixing occurs at a temperature of: (i) −40° C. to 30° C.; or (ii) −15° C. to −25° C.

22. The process of claim 1, wherein the admixing occurs for: (i) 1 hour to 72 hours; or (ii) 14 hours to 18 hours.

23. The process of claim 1, wherein compound (II) is present at: (i) 0.9 to 2 molar equivalents, based upon 1.0 molar equivalents of compound (I); or (ii) 1.0 molar equivalents, based upon 1.0 molar equivalents of compound (I).

24. The process of claim 1, wherein the asymmetric catalyst is present at: (i) 0.005 to 1.50 molar equivalents, based upon 1.0 molar equivalents of compound (I); or (ii) 0.25 molar equivalents, based upon 1.0 molar equivalents of compound (I).

25. The process of claim 1, wherein compound Y is produced with an enantiomeric excess of: (i) 30% or more; or (ii) 40% or more; or (iii) 50% or more.

* * * * *